United States Patent
Govindassamy

(12) 
(10) Patent No.: US 10,420,022 B1
(45) Date of Patent: Sep. 17, 2019

(54) METHOD AND APPARATUS FOR POWER SAVING IN MOBILE HOTSPOTS

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 0 days.

(21) Appl. No.: 15/634,628

(22) Filed: Jun. 27, 2017

(51) Int. Cl.
| | |
|---|---|
| H04W 52/02 | (2009.01) |
| H04W 76/28 | (2018.01) |
| H04W 4/80 | (2018.01) |
| H04W 84/12 | (2009.01) |

(52) U.S. Cl.
CPC ......... *H04W 52/0203* (2013.01); *H04W 4/80* (2018.02); *H04W 76/28* (2018.02); *H04W 84/12* (2013.01)

(58) Field of Classification Search
CPC ... H04W 52/0203; H04W 4/80; H04W 76/28; H04W 84/12
See application file for complete search history.

(56) References Cited

U.S. PATENT DOCUMENTS

| | | | |
|---|---|---|---|
| 7,502,012 B2 | 3/2009 | Hatano | |
| 2011/0196547 A1 | 8/2011 | Park et al. | |
| 2012/0286428 A1* | 11/2012 | Sakuma | H01L 21/76898 |
| | | | 257/774 |
| 2012/0314693 A1* | 12/2012 | Medapalli | H04W 40/02 |
| | | | 370/338 |
| 2012/0326514 A1 | 12/2012 | Kim et al. | |
| 2013/0031258 A1 | 1/2013 | Mukai et al. | |
| 2014/0153556 A1* | 6/2014 | Wu | H04L 12/66 |
| | | | 370/338 |
| 2015/0163743 A1 | 6/2015 | Narasimha et al. | |
| 2016/0036772 A1* | 2/2016 | Pratapa | H04L 61/2061 |
| | | | 709/245 |
| 2016/0094515 A1* | 3/2016 | Chechani | H04W 12/08 |
| | | | 726/1 |

OTHER PUBLICATIONS

U.S. Appl. No. 15/608,094, filed May 30, 2017. Title: Connectivity State Control for Communication Device.

* cited by examiner

*Primary Examiner* — Dady Chery
(74) *Attorney, Agent, or Firm* — Lerner, David, Littenberg, Krumholz & Mentlik, LLP

(57) ABSTRACT

A mobile Hotspot is a device that includes a modem for mobile broadband access and a Hotspot Access Point to distribute the internet to local client devices which may not have mobile broadband access. Client devices may start getting internet service from a mobile Hotspot and at some point may stop using the internet service. However, the mobile Hotspot device may continue to broadcast the signals even when none of the client devices are requiring internet service. Furthermore, the mobile Hotspot device may continue to perform required operations to maintain connectivity with the mobile network using the mobile broadband modem even when there is no need for it on the client device side. A method and apparatus are disclosed that enable a mobile Hotspot to reduce power consumption when the there are no client devices connected to it or when the client device not requiring internet service.

30 Claims, 21 Drawing Sheets

FIG. 9

| Parameter | Description | Example Values |
|---|---|---|
| $T_{nm}$ | Timer duration to detect No Mobility state | 10 min |
| $T_{lm}$ | Timer duration to detect Low Mobility state | 2 min |
| $T_{hm}$ | Timer duration to detect High Mobility state | 30 sec |
| $C_{nm}$ | Threshold for number of cell changes observed within $T_{nm}$ to detect No Mobility state | 1 |
| $C_{lm}$ | Threshold for number of cell changes observed within $T_{lm}$ to detect Low Mobility state | 3 |
| $C_{hm}$ | Threshold for number of cell changes observed within $T_{hm}$ to detect High Mobility state | 4 |

FIG. 10

| Scenario | Mobility state | WLAN/USB/ Bluetooth Client Device Connection Status | WLAN/USB/ Bluetooth Client Device Active IP data Transfer Status | Idle DRX cycle | Trigger for Connected mode to Idle DRX mode Transition | Trigger for Idle DRX mode to Sleep mode Transition |
|---|---|---|---|---|---|---|
| 1 | No | Yes | Yes | $IDLE\_DRX_{hm\_ac}$ | No | No |
| 2 | Low | Yes | Yes | $IDLE\_DRX_{hm\_ac}$ | No | No |
| 3 | High | Yes | Yes | $IDLE\_DRX_{hm\_ac}$ | No | No |
| 4 | No | No | No | $IDLE\_DRX_{hm\_nc}$ | $Tnc\_c$ | $Tnc\_drx$ |
| 5 | Low | No | No | $IDLE\_DRX_{hm\_nc}$ | $Tnc\_c$ | $Tnc\_drx$ |
| 6 | High | No | No | $IDLE\_DRX_{hm\_nc}$ | $Tnc\_c$ | $Tnc\_drx$ |
| 7 | No | Yes | No | $IDLE\_DRX_{hm\_ac}$ | $Tdi\_c$ | $Tdi\_drx$ |
| 8 | Low | Yes | No | $IDLE\_DRX_{hm\_ac}$ | $Tdi\_c$ | $Tdi\_drx$ |
| 9 | High | Yes | No | $IDLE\_DRX_{hm\_ac}$ | $Tdi\_c$ | $Tdi\_drx$ |

FIG. 11

| Parameter | Description | Example Values |
|---|---|---|
| IDLE_DRX$_{nm\_nc}$ | Idle DRX mode periodicity: When the mobile Hotspot is in No Mobility and No active client state | ≥ 2.5 sec |
| IDLE_DRX$_{nm\_ac}$ | Idle DRX mode periodicity: When the mobile Hotspot is in No Mobility but with active client state | ≥ 2.5 sec |
| IDLE_DRX$_{lm\_nc}$ | Idle DRX mode periodicity: When the mobile Hotspot is in Low Mobility and No active client state | ≥ 2.5 sec |
| IDLE_DRX$_{lm\_ac}$ | Idle DRX mode periodicity: When the mobile Hotspot is in Low Mobility and with active client state | 1.25 sec |
| IDLE_DRX$_{hm\_nc}$ | Idle DRX mode periodicity: When the mobile Hotspot is in High Mobility and No active client state | ≥ 2.5 sec |
| IDLE_DRX$_{hm\_ac}$ | Idle DRX mode periodicity: When the mobile Hotspot is in High Mobility and with active client state | 320 ms |

FIG. 12

| Current WWAN Operating Mode Name | Event Trigger | Target WWAN Operating Mode Name |
|---|---|---|
| Sleep | WLAN/USB client device connected to the mobile Hotspot initiates IP data transfer | Idle DRX |
| Idle DRX | WLAN/USB client device connected to the mobile Hotspot initiates IP data transfer or WWAN modem initiates active IP data transfer | Connected [with IP connection] |
| Idle DRX | Expiry of $T_{nc\_drx}$, $T_{di\_drx}$, $NDRX_{nm\_nc}$, $NDRX_{nm\_ac}$, $NDRX_{hm\_nc}$, $NDRX_{hm\_ac}$, $NDRX_{hm\_nc}$ or $NDRX_{hm\_ac}$ | Sleep |
| Connected [with IP connection] | Expiry of $T_{nc\_c}$ or $T_{di\_c}$ | Idle DRX |

FIG. 13A

| Timer | Description | Default |
|---|---|---|
| Tnc_c | Timer threshold to monitor no active WLAN client connection for the specified period of time. When the WWAN modem is in connected mode, and no active WLAN client connections observed until this timer expires, the Mobile Hotspot Controller may configure the WWAN modem transition from Connected mode to Idle DRX mode. | 5 min |
| Tdi_c | Timer threshold to monitor no active IP data transfer for the specified period of time. When the WWAN is in Connected mode, and no IP data transfer initiation takes place from any connected WLAN client device in DL or UL until this timer expires, then the Mobile Hotspot Controller may configure the WWAN modem to transition from Connected mode to Idle DRX state. | 10 min |
| Tnc_drx | Timer threshold to monitor no active WLAN client connection for the specified period of time. When the WWAN modem is in Idle DRX mode, and no active WLAN client connections observed until this timer expires, then Mobile Hotspot Controller may configure the WWAN modem to transition from Idle DRX to Sleep mode. | 5 min |
| Tdi_drx | Timer threshold to monitor no active IP data transfer for the specified period of time. When the WWAN is in Idle DRX mode, and no IP data transfer initiation takes place from any connected WLAN client device in DL or UL until this timer expires, then Mobile Hotspot Controller may configure the WWAN modem transition from Idle DRX to Sleep mode. | 5 min |
| Twf_nc | When all the WLAN client devices are disconnected and when there are other client devices connected, e.g., USB client device, the Mobile Hotspot Controller may configure WLAN modem to enter power off state. The WWAN modem may transition its state according to its corresponding timers. | 5 min |
| Twf_drx | When one or more WLAN client devices are connected but there is no active IP data transfer initiated by any of them, and when there are other client devices connected, e.g., USB client device, the Mobile Hotspot Controller may configure WLAN modem to enter power off state. The WWAN modem may transition its state according to its corresponding timers. | 5 min |
| Tusb | When a client device is connected through USB connectivity interface with the mobile Hotspot device and for Tusb duration if there is no active DL and/or UL data transfer, the Mobile Hotspot Controller may send notification to its USB subsystem to suspend the USB interface. | 5 min |

FIG. 13B

| Counter | Description | Default |
|---|---|---|
| $NDRX_{nm\_nc}$ | Number of $IDLE\_DRX_{nm\_nc}$ cycles for which there is no connection from WLAN client observed by the WLAN AP. When this count is reached, the Mobile Hotspot Controller may configure the WWAN AP to enter Sleep mode. | 100 |
| $NDRX_{nm\_ac}$ | Number of $IDLE\_DRX_{nm\_ac}$ cycles for which there is no active IP data transfer from WLAN client observed by the Mobile Hotspot Controller. When this count is reached, the Mobile Hotspot Controller may configure the WWAN AP to enter Sleep mode. | 100 |
| $NDRX_{lm\_nc}$ | Number of $IDLE\_DRX_{lm\_nc}$ cycles for which there is no connection from WLAN client observed by the WLAN AP. When this count is reached, the Mobile Hotspot Controller may configure the WWAN AP to enter Sleep mode. | 100 |
| $NDRX_{lm\_ac}$ | Number of $IDLE\_DRX_{lm\_ac}$ cycles for which there is no active IP data transfer from WLAN client observed by the Mobile Hotspot Controller. When this count is reached, the Mobile Hotspot Controller may configure the WWAN AP to enter Sleep mode. | 500 |
| $NDRX_{hm\_nc}$ | Number of $IDLE\_DRX_{hm\_nc}$ cycles for which there is no connection from WLAN client observed by the WLAN AP. When this count is reached, the Mobile Hotspot Controller may configure the WWAN AP to enter Sleep mode. | 100 |
| $NDRX_{hm\_ac}$ | Number of $IDLE\_DRX_{hm\_ac}$ cycles for which there is no active IP data transfer from WLAN client observed by the Mobile Hotspot Controller. When this count is reached, the Mobile Hotspot Controller may configure the WWAN AP to enter Sleep mode. | 1000 |

METHOD AND APPARATUS FOR POWER SAVING IN MOBILE HOTSPOTS

CROSS REFERENCE TO RELATED APPLICATIONS

This application is related to U.S. application Ser. No. 15/608,094 filed May 30, 2017, the disclosure of which is hereby incorporated herein by reference.

BACKGROUND

Internet access is becoming ubiquitous and the means by which the access is obtained varies widely. For example, the internet access may be through a Digital Subscriber Line (DSL), a cable modem, a fiber optic network, a wireless communication network, etc. When the internet service provides high data rates it is often referred to as broadband internet service. Broadband internet service is generally understood to be a service that is always on and offers data rates on the order of mega-bits per second for both download and upload.

A client device as defined in the present disclosure is a device that may access the internet from one or more of the sources from which the internet service may be available. Such client devices may include conventional devices such as a smartphone, a tablet, a feature-phone, a laptop or a desktop personal computer, etc. Other client devices may include devices that are embedded within devices that perform other functions such as an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, industrial equipment, etc. These types of devices are collectively referred to herein as machine type client devices.

These diverse types of client devices may access the internet service directly through one of the sources of primary internet access mentioned earlier. Alternatively, the client devices may access the internet through a local network that performs distribution of the primary internet access to the users localized in a given area. Examples of such local networks include Local Area Network (LAN) using Ethernet, Wireless LAN (WLAN) commonly known as Wi-Fi, or some other local area networking schemes. When a client device is in the proximity of a location where such a LAN or WLAN access is available, it may access the internet using the LAN or WLAN. FIG. 1 illustrates an example scenario of client devices accessing internet over a WLAN network, which is connected to a traditional wireline internet service such as DSL or cable modem. The local area where WLAN service is available is often referred to as Hotspot. The device that offers the WLAN service in a given local area is referred to as an Access Point (AP). In the present disclosure, the terms Hotspot AP, WLAN AP, or Hotspot are used interchangeably to refer to the device that offers the WLAN service in a given local area.

A Hotspot AP may be connected to DSL or cable modem through any of the standardized interfaces such as Universal Serial Bus (USB), Ethernet, or proprietary interfaces. In some cases, the DSL or cable modem and the Hotspot AP may be part of a single physical device. In such cases the interface between the DSL or cable modem and AP may use Secure Digital Input Output (SDIO) or other suitable interface.

Client devices may also obtain internet access over mobile wireless networks. These mobile wireless networks are often referred to as Wireless Wide Area Network (WWAN). The internet service offered by such networks is often referred to as mobile broadband internet or Mobile Broadband (MB) and the mobile wireless networks are often referred to as mobile broadband networks. The terms WWAN and MB are used interchangeably herein.

As the variety of client devices has increased and the demand for MB access has increased, a device known as a mobile Hotspot is commonly used. A mobile Hotspot device includes both a modem for MB access and a WLAN AP (Hotspot AP) to distribute the internet to local client devices. FIG. 2 illustrates the block diagram of an example mobile Hotspot device. As shown in FIG. 2, for the chosen example, the WWAN modem and the WLAN AP may be connected to each other via one of the standard interfaces used in the industry such as USB, SDIO, or proprietary interfaces. The WWAN modem and the WLAN AP may be controlled by the Mobile Hotspot Controller which may be a separate processor or hardware logic circuitry. Alternatively, the Mobile Hotspot Controller may be implemented as software and may run on the Central Processing Unit (CPU) or other processor of the WWAN modem or WLAN AP. The hardware and software comprising the WWAN modem may be referred to as the WWAN modem subsystem. Similarly, the hardware and software comprising the WLAN AP may be referred to as the WLAN AP subsystem. In another mobile Hotspot example, the WWAN modem and the WLAN AP may be a single Integrated Circuit (IC) as shown in FIG. 3. The WWAN modem and the WLAN AP may be controlled by the Mobile Hotspot Controller which may be running in a single CPU common to all. The Mobile Hotspot Controller may be implemented as a processor or a processing logic circuitry or combinations of the two. In yet another example, a mobile Hotspot comprising WWAN modem, WLAN AP, Bluetooth™ Master Controller, and USB Host controller is illustrated in FIG. 4. In this example, the four subsystems may be controlled by the Mobile Hotspot Controller which may be running in a separate CPU with its associated memory.

Some mobile Hotspot devices may serve as a single function device, i.e., they only perform the mobile Hotspot function. Such mobile Hotspot devices may take many different form factors such as a mobile Hotspot integrated into an automobile, a standalone device that can be carried around with or without a battery, integrated into an accessory device for a tablet, a standalone device that can be powered by a wall outlet, etc.

Some client devices have multiple capabilities and being a Hotspot is one of the capabilities. For example, a smartphone may have a mobile broadband modem that may be used to get mobile internet service directly from the mobile broadband network as illustrated in FIG. 5. The flow of internet data is as shown in FIG. 5 from the mobile broadband modem to the application processor that processes the download and upload data and interacts with the user via the display and other elements of the user interface such as audio, vibration, etc. The smartphone may also have a WLAN modem to access internet service over a WLAN AP. When it is in the vicinity of a WLAN AP, it may use internet service from the WLAN AP as illustrated in FIG. 1. In another smartphone example, the mobile broadband modem, the WLAN AP and the Application Processor may be integrated into a single Integrated Circuit (IC) as shown in FIG. 6.

A smartphone may also serve as a mobile Hotspot to provide internet service over WLAN to other client devices in its vicinity. FIG. 7 illustrates an example scenario where the smartphone serves as a mobile Hotspot and provides internet service to a client device which may have only a WLAN access. In another smartphone mobile Hotspot example, the mobile broadband modem, the WLAN AP and the Application Processor may be integrated into a single IC as shown in FIG. 8.

An example of a mobile broadband network is the Long Term Evolution (LTE) from the $3^{rd}$ Generation Partnership Project (3GPP). The LTE technology and its evolution are often referred to as fourth generation (4G) technologies. A client device may also use any of the previous generation technologies such as "2G", "3G" from 3GPP or 3GPP2 and/or other standardization bodies. A client device may also use future generation technologies for mobile Hotspot and mobile networks. Different sources of internet are generically referred to as networks herein.

Often client devices may start getting internet service from a mobile Hotspot device and at some point may stop using the internet service from the mobile Hotspot device. However, generally there may be no explicit indication from the client devices to the WLAN AP that they no longer need the service. The mobile Hotspot device may continue to broadcast the WLAN signals such as the beacon signal even when none of the client devices in its coverage area are requiring internet service or even when there is no client device present in its coverage area. Furthermore, the mobile Hotspot device may continue to perform the required operations such as receiving paging messages, receiving periodic broadcast messages, measurements on serving and neighbor cells, cell change, routing area updates, etc. for the connectivity with the mobile network using the WWAN modem even though there is no client device requiring any service on the WLAN AP.

SUMMARY

A method and apparatus are disclosed that may enable a mobile Hotspot device to reduce power consumption when there are no client devices connected to it or when client devices are connected to it but not actively requiring internet service. The reduced power consumption may improve the battery usage and hence may improve user experience.

In accordance with an aspect of the present disclosure, a method for power saving in a mobile hotspot device may include controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device.

In one alternative, the method may further include controlling, by the processing device, when a mobile broadband network releases an IP data connection with the WWAN modem, receiving a notification from the WWAN modem that the IP data connection is released; and entry of the WWAN modem into Idle Discontinuous Reception (DRX) mode.

In one alternative, the method may further include controlling, by the processing device, when the WWAN modem is in a Connected mode, maintaining a timer of duration Tdi_c; and transmitting a command to the WWAN modem to release an IP data connection with a mobile broadband network, when there is no active IP data transfer for the duration Tdi_c.

In one alternative, the mobile hotspot device includes the processing device and a second processing device different from the processing device, in which the second processing device is in the WWAN modem and in which the processing device is external to the WWAN modem, and the method further may include controlling, by the second processing device, monitoring an IP data connection with a mobile broadband network and tracking of IP data transfer at the mobile hotspot device.

In one alternative, the method may further includecontrolling, by the second processing device, when no IP data transfer is observed by the second processing device after a time duration Tdi_c, releasing the IP data connection with the mobile broadband network and notifying the processing device that the IP data connection is released.

In one alternative, the method may further include controlling, by the processing device, when the WWAN modem is in an Idle Discontinuous Reception (DRX) mode, maintaining a timer of duration Tdi_drx; and monitoring an IP data connection in the mobile hotspot device and tracking IP data transfer.

In one alternative, the method may further include controlling, by the processing device, when there is no IP data transfer for the duration Tdi_drx, transmitting commands to the WWAN modem to transition from the Idle DRX mode to Sleep mode.

In one alternative, the method may further include controlling, by the second processing device, when no IP data transfer is observed by the second processing device after a time duration Tdi_drx, transitioning of the WWAN modem from the Idle DRX mode to a Sleep mode and notifying the processing device of the transition.

In one alternative, the method may further include controlling, by the processing device, when the WWAN modem is in a Connected mode, maintaining a timer of duration Tnc_c; and when there is no active WLAN client device connected to a WLAN Access Point (AP) in the mobile Hotspot for the duration of Tnc_c and no other client device is connected to the mobile hotspot device, transmitting commands to the WWAN modem to release a connection with the mobile broadband network.

In one alternative, the WWAN modem may transition from the Connected mode to an Idle Discontinuous Reception (DRX) mode after releasing the connection with the mobile broadband network.

In one alternative, the time duration Tnc_c may be less than or equal to a time duration Tdi_drx used to monitor an IP data connection in the mobile Hotspot device and track an IP data transfer when the WWAN modem is in the Idle DRX mode.

In one alternative, the method may further include controlling, by the processing device, when the WWAN modem is in an Idle Discontinuous Reception (DRX) mode, maintaining a timer of duration Tnc_drx; and when there is no active WLAN client device connected to a WLAN Access Point (AP) in the mobile hotspot device for the duration of Tnc_drx and no other client device is connected to the mobile hotspot device, transmitting commands to the WWAN modem to transition from the Idle DRX mode to Sleep Mode.

In one alternative, the mobility state may be a no mobility state, a low mobility state or a high mobility state.

In one alternative, the method may further include controlling, by the processing device, based on a determined state for (2), (3) and (4), determining a cycle duration of Idle Discontinuous Reception (DRX) for a WWAN modem mode of the mobile hotspot device; and when the determined state is changed to another determined state for (2), (3) and (4), configuring the WWAN modem with a second cycle duration of the Idle DRX in accordance with the another determined state.

In one alternative, the mobile hotspot device may include the processing device and a second processing device different from the processing device, in which the second processing device is in the WWAN modem and in which the processing device is external to the WWAN modem, and the method further may include controlling, by the second processing device, when the WWAN modem receives an acknowledgement from the mobile broadband network concerning a change in the Idle DRX cycle of the WWAN modem, confirming the change in the Idle DRX cycle to the processing device.

In one alternative, the method may further include controlling, by the processing device, when the processing devices determines that at least one third client device is initiating a connection to the mobile hotspot device and the WWAN modem is in an Idle Discontinuous Reception (DRX) mode, transmitting a request to the WWAN modem to connect with a mobile broadband network to establish an IP connection.

In one alternative, the method may further include controlling, by the processing device, when the processing device determines that IP data transfer is initiated from at least one third client device connected with the mobile hotspot device and the WWAN modem is in an Idle Discontinuous Reception (DRX) mode, transmitting a request to the WWAN modem to connect with a mobile broadband network to establish an IP connection.

In one alternative, the method may further include controlling, by the processing device, when the processing device determines that IP data transfer is initiated from the at least one third client device connected with the mobile hotspot device and the WWAN modem is in the Idle DRX mode, waiting for the WWAN modem to establish a connection with the mobile broadband network and for notification from the WWAN modem of successful connection establishment, before sending an IP data transfer request to the WWAN modem.

In one alternative, transition of the operating mode of the WWAN modem from Idle Discontinuous Reception (DRX) mode to Sleep Mode may be triggered based on at least one of expiration of a timer of duration Tnc_drx for tracking whether an active WLAN client device is connected with a WLAN Access Point (AP) of the mobile hotspot device, expiration of a timer of duration Tdi_drx for tracking whether there is an IP data transfer for an IP data connection in the mobile hotspot device, a determination of no connection from a WLAN client device observed by the WLAN AP after a number of $IDLE\_DRX_{nm\_nc}$ cycles, a determination of no active IP data transfer from a second WLAN client device observed by the WLAN AP after a number of $IDLE\_DRX_{nm\_ac}$ cycles, a determination of no connection from a third WLAN client device observed by the WLAN AP after a number of $IDLE\_DRX_{lm\_nc}$ cycles, a determination of no active IP data transfer from a fourth WLAN client device observed by the WLAN AP after a number of $IDLE\_DRX_{lm\_ac}$ cycles, a determination of no connection from a fifth WLAN client device observed by the WLAN AP after a number of $IDLE\_DRX_{hm\_nc}$ cycles, or a determination of no active IP data transfer from a sixth WLAN client device observed by the WLAN AP after a number of $IDLE\_DRX_{hm\_ac}$ cycles.

In one alternative, a plurality of types of client devices may be connectable with the mobile hotspot device to obtain internet service.

In one alternative, the method may further include controlling, by the processing device, when at least one third client device with a plurality of types of short range communication subsystems is connected with the mobile hotspot device, configuring a WWAN subsystem of the mobile hotspot device to an Idle Discontinuous Reception (DRX) mode or Sleep Mode only when no client device is connected to any short range communication subsystem of the mobile hotspot device and no active data transfer is ongoing in any of the at least one third client device connected to any of the short range communication subsystems of the mobile hotspot device.

In one alternative, the method may further include controlling, by the processing device, operating a WLAN Access Point (AP) of the mobile hotspot device in an Active mode and a Sleep mode, in which, in the Active mode, at least one of (i) the WLAN AP is controlled to broadcast a beacon signal to enable a first WLAN client device to detect presence of the WLAN AP, (ii) the WLAN AP is connected to at least one second WLAN client device and no active IP data transfer is ongoing, or (iii) the WLAN AP is involved in active IP data transfer with at least one third WLAN client device, and in which, in the Sleep Mode, the WLAN AP is powered off and not performing any receive or transmit operations.

In one alternative, the method may further include controlling, by the processing device, when a third client device with a plurality of type of short range communication subsystems is connected with the mobile hotspot device via Bluetooth or USB, operating a Bluetooth or USB subsystem of the mobile hotspot device in an Active mode and a Sleep mode.

In one alternative, the method may further include controlling, by the processing device, when a third client device is connected with the mobile hotspot device over a connectivity interface including at least one of USB or Bluetooth, and in active at least one of Downlink (DL) or Uplink (UL) data transfer, and when no WLAN client device is connected with a WLAN Access Point (AP) of the mobile hotspot device for a time duration Twf_nc, configuring a WLAN AP subsystem of the mobile hotspot device to enter into a Sleep mode while a WWAN subsystem is in Connected mode.

In one alternative, the method may further include controlling, by the processing device, (i) when a third client device is connected with the mobile hotspot device over a connectivity interface including at least one of USB or Bluetooth and is performing active IP data transfer, and (ii) when at least one first WLAN client device is connected with a WLAN Access Point (AP) of the mobile hotspot device and no active IP data transfer is initiated by any of the at least one first WLAN client device for a time duration Twf_drx, configuring a WLAN AP subsystem of the mobile hotspot device to enter into a Sleep mode while a WWAN subsystem of the mobile hotspot device is in Connected mode.

In one alternative, the method may further include controlling, by the processing device, when a third client device is connected through a USB connectivity interface with the mobile hotspot device and for a time duration Tusb there is no active at least one of Downlink (DL) or Uplink (UL) data transfer, transmitting a notification to a USB subsystem of the mobile hotspot device to suspend the USB interface.

In one alternative, the method may further include controlling, by the processing device, when the USB subsystem is suspended, and each other modem subsystem in the mobile Hotspot is not connected to any client device, configuring the WWAN modem to enter Sleep mode.

In one alternative, the mobile hotspot device may include a first CPU for operating a WWAN modem subsystem of the mobile hotspot device and a second CPU external to the first CPU for operating a WLAN Access Point (AP) modem subsystem of the mobile hotspot device, and the method may further include controlling, by the processing device, sleep and wake-up events independently for the WWAN modem subsystem and the WLAN AP modem subsystem for power saving.

In one alternative, the mobile hotspot device may include a WWAN modem subsystem including first modem hardware and a WLAN Access Point (AP) modem subsystem including second modem hardware, and the method further may include controlling, by the processing device, operation of the WWAN modem subsystem and the WLAN AP modem subsystem, and power management for power savings independently for the first modem hardware of the WWAN modem subsystem and the second modem hardware of the WLAN AP modem subsystem.

In one alternative, the method may further include controlling, by the processing device, changing a value of a timer or counter used to determine whether to configure the WWAN modem to enter an Idle Discontinuous Reception (DRX) mode or Sleep Mode, based on time of day.

In one alternative, a default value may be used for the timer or the counter when a local time at the mobile hotspot device is within a predetermined period.

In one alternative, the method may further include controlling, by the processing device, changing the value of the timer or the counter at different times of the day for each day of the week.

In one alternative, the method may further include controlling, by the processing device, tracking a history of connections with and internet access from the mobile hotspot device by at least one third client device over a period of time, in which the history includes timestamp of access; and based on the history, adapting the value of the timer or the counter to increase when no access is expected and decrease when access is expected from the at least one third client device.

In one alternative, the method may further include controlling, by the processing device, tracking identity, time of access, amount of Downlink (DL) and Uplink (UL) IP data transfer for each third client device connecting to the mobile hotspot device using a connectivity interface including at least one of WLAN Access Point (AP), USB or Bluetooth; and based on internet access history of the each third client device, adapting a configuration of the mobile hotspot device to balance power saving and responsiveness to an action by a user.

In one alternative, the method may further include controlling, by the processing device, based on WWAN cell identity as a proxy for location of the mobile hotspot device and local time of day, configuring an Idle Discontinuous Reception (DRX) cycle for a WWAN mode of the mobile hotspot device, a beacon interval for a WLAN Access Point (AP) of the mobile hotspot device, and predetermined timers and counters at the mobile hotspot device in accordance with power saving and being responsive to user requirements according to time and location.

In one alternative, the mobile hotspot device may be a smartphone client device operating in a mobile Hotspot mode, a standalone mobile Hotspot device or a Customer Premises Equipment.

In accordance with an aspect of the present disclosure, an apparatus may provide for power saving in a mobile hotspot device, and the apparatus may include circuitry configured to control powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device.

In accordance with an aspect of the present disclosure, a wireless communication device may include a receiver to receive a wireless communication; and a processing device configured for power saving in the wireless communication device as a mobile hotspot device, wherein the processing device may be configured to control powering of a component of the wireless communication device based on (1) operating mode of a Wireless Wide Area Network (WWAN) modem in the wireless communication device, (2) a mobility state of the WWAN modem, (3) whether any client device over Wireless LAN (WLAN), Bluetooth, or a USB interface is connected to the wireless communication device and (4) Internet Protocol (IP) data connection status of any second client device connected to the wireless communication device.

BRIEF DESCRIPTION OF THE DRAWINGS

FIG. 9 illustrates a table of example values for timers and counters for determining the mobility state of the WWAN modem.

FIG. 10 illustrates a table of scenarios for the mobile Hotspot device as a function of the mobility state of the WWAN modem, the connectivity and data transfer states of the client devices along with events and triggers for each scenario according to the aspects of the present disclosure.

FIG. 11 illustrates a table of example values for different Discontinuous Reception (DRX) cycles as a function of different mobility, connectivity and data transfer states of the client device according to the aspects of the present disclosure.

FIG. 12 illustrates a table of operating mode transitions for a WWAN modem along with the triggers for the transitions according to the aspects of the present disclosure.

FIG. 13A illustrates a table of example values for timers that trigger WWAN modem operating mode transitions according to the aspects of the present disclosure.

FIG. 13B illustrates a table of example values for Idle DRX cycle counters that trigger WWAN modem operating mode transitions according to the aspects of the present disclosure.

DETAILED DESCRIPTION

Figure 1:
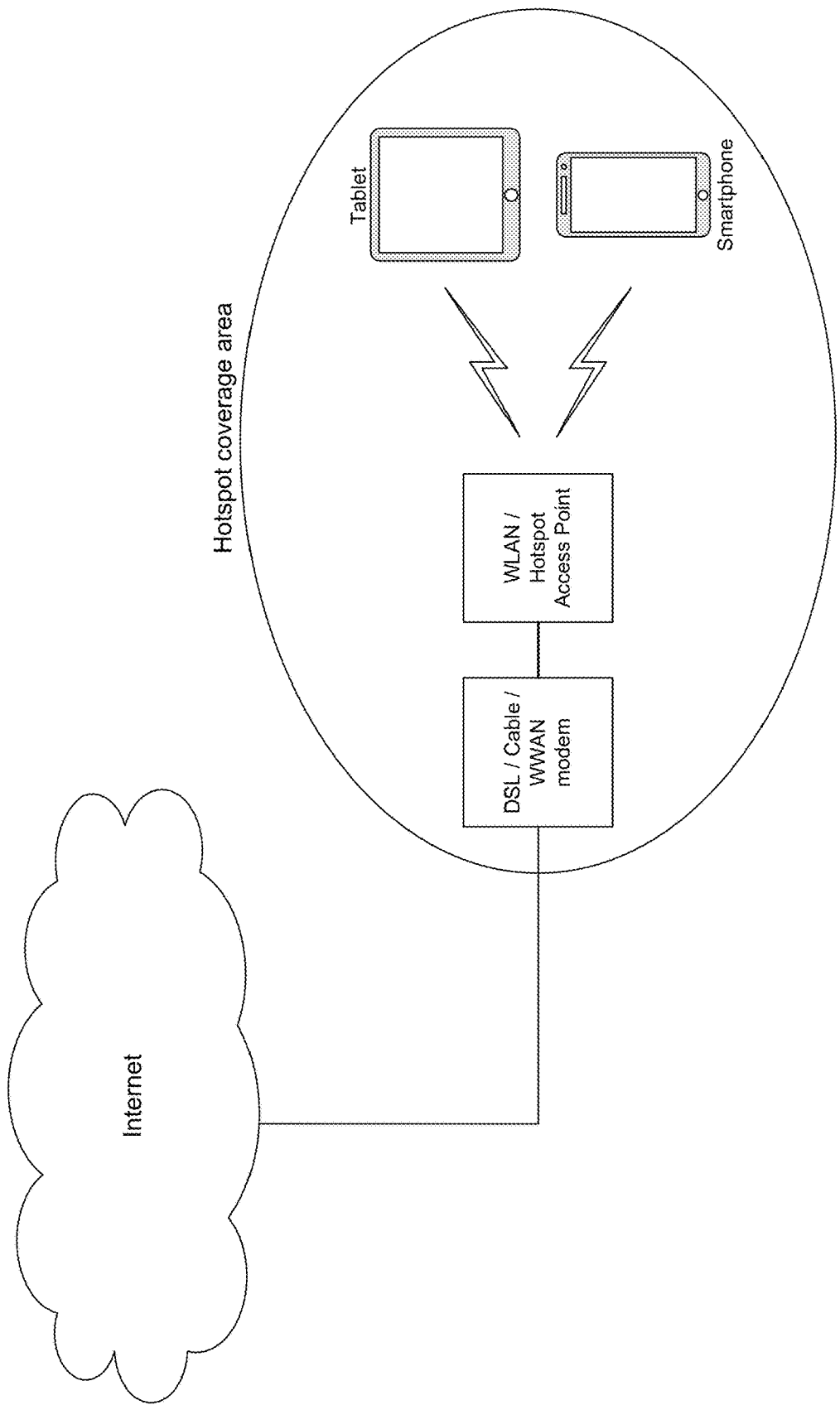
FIG. 1 illustrates an example scenario of internet access using Wireless Local Area Network (WLAN) network over a traditional wire-line internet service.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Although aspects of the present disclosure are illustrated using a particular type of client device, the disclosure is applicable to any type of client device some of which are listed in an earlier section of the present disclosure.

According to an aspect of the present disclosure, power saving in a mobile Hotspot device may be based on the following four power saving criteria: (1) the operating mode of WWAN modem in the mobile Hotspot device (2) the Mobility state of the WWAN modem (3) whether any client device (over WLAN, Bluetooth, or USB interface) is connected to the mobile Hotspot and (4) IP data connection status of any client device connected to the mobile Hotspot. Each of the four power saving criteria may have different values, modes, states, etc. The combination of particular values, modes, and states of each of the four power saving criteria may be used to control various parts of a mobile Hotspot to improve its power saving according to the aspects of the present disclosure. The methods for determination of each of the above four criteria are described next.

The first of the four power saving criteria, the WWAN modem operating mode, may be categorized into three modes as follows.

Sleep mode: In this mode, the WWAN modem may be completely powered down. This is equivalent to WWAN modem off condition.

Idle Discontinuous Reception (DRX) mode: In this mode, the WWAN modem may not be in an active internet connection with the mobile broadband network. The WWAN modem may have released the internet connection and may stay in Idle DRX mode, i.e., it may periodically wake-up and receive paging messages from the mobile broadband network and may perform measurements for cell change and other network procedures. This is referred to as the "monitoring" sub-mode of the Idle DRX mode. For the remaining duration, the WWAN modem may go to another sub-mode, referred to as "standby" sub-mode, in which it may power down most of its circuitry but may retain some critical information and may keep active only necessary portion of its circuitry. Note that the Idle DRX mode of the WWAN modem may be internally controlled by the WWAN modem.

Connected mode: In this mode, the WWAN modem may be connected to the mobile broadband network and may have an active internet connection. Furthermore, Downlink (DL), Uplink (UL) or both DL and UL data transfer may be ongoing.

The second of the four power saving criteria, the Mobility state of the mobile Hotspot device, which includes the WWAN modem, may be obtained from, and is the same as, the Mobility state of the WWAN modem. The phrases "Mobility state of a mobile Hotspot device" and "Mobility state of the WWAN modem" are used interchangeably herein. While the mobility of a mobile Hotspot device can be determined using a satellite based navigation system such as a Global Positioning System (GPS), such methods may lead to increased power consumption due to the use of a GPS receiver. The Mobility state of the WWAN modem and the mobile Hotspot may be determined without relying on a navigation system such as GPS. If a satellite based navigation system such as GPS is used by a mobile Hotspot device, it can be also used as one of the inputs or the only input for determining the Mobility state of a WWAN. The second of the four power saving criteria, the Mobility state of a WWAN modem, can be categorized into three states as follows.

No Mobility state: In this state the WWAN modem may be in a stationary condition or it may be moving at a very low speed such as walking inside a home, office, or any other indoor or pedestrian environment. In such scenarios, the WWAN modem may be connected to or camped on a single cell of the mobile broadband network either all or most of the time. This state may also correspond to another scenario in which the WWAN modem may be stationery but is in a location with poor coverage or in a cell edge situation where the WWAN modem may do frequent cell changes. However, the cell changes may occur within a set of few cells. For example, cell changes may occur within two or three cells, either all or most of the time. The set of cells involved in cell changes can be determined by keeping track of the identities of the cells involved in cell changes. For example, in case of 3GPP LTE, the Cell Global Identity (CGI) or the Physical Cell Identity (PCI) may be used as cell identities. If the cell changes are amongst the same set of cells, then those cell changes may be treated as no cell change for mobility state determination purposes. In such scenarios, the Mobility state of the WWAN modem can be categorized as No Mobility state. Note that the term "No Mobility" state is merely a name for referring to a set of scenarios where the client device may be either stationary or moving at a very slow speed such as walking in indoor or pedestrian environments. As such the "No Mobility" state does not necessarily imply that the WWAN modem is not moving at all.

The Mobility state of the WWAN modem may be monitored by the Mobile Hotspot Controller by keeping track of the cell change indications from the WWAN modem. For example, if the number of cell changes observed in a time duration of Tnm is lower than or equal to the threshold Cnm, then the Mobile Hotspot Controller may consider the WWAN modem to be in No Mobility state. In some WWAN radio access technologies such as Code Division Multiple Access (CDMA), the WWAN modem may be connected to more than one cell at the same time. In such cases, the Mobile Hotspot Controller may keep track of the identities of cells to which the WWAN modem is connected and may determine the Mobility state accordingly.

Low Mobility state: This state may correspond to a scenario in which the WWAN modem may be moving at low speed, for example when driving through residential areas or busy streets. In this scenario, the WWAN modem may change cells occasionally. This may be monitored by the Mobile Hotspot Controller by keeping track of the number of cell change indications from the WWAN modem. For example, if the number of cell change indications observed in a time duration of Tim is lower than the threshold Cim, then the Mobile Hotspot Controller may consider the WWAN modem to be in Low Mobility state. The case of small number of cell changes in a given time within a set of few cells in No Mobility state can be distinguished from the case of small number of cell changes in a given time across different cells by keeping track of the identities of the cells involved in cell changes. When a user keeps the mobile Hotspot at home in stationary condition, it may be in No Mobility state even though there may be few cell changes within a small set of cells. The identities of the cells in this small set can be used to ensure that the cell changes are happening only within a few cells. When the user takes the mobile Hotspot on the way to work, there may be few cell changes and the identities of the cells involved in those cell changes may be different from the small set of cells during the No Mobility state. The change of cell identities along with the cell changes may be used to transition to the Low Mobility state or High Mobility state as described next.

High Mobility state: This state may correspond to a scenario in which the WWAN modem may be moving at higher speed, for example when driving on highways. In this scenario, the WWAN modem may change cells frequently. This may be monitored by the Mobile Hotspot Controller by keeping track of the number of cell change indications from the WWAN modem. For example, if the number of cell changes observed in a time duration of Thin is higher than or equal to the threshold Chin, then the Mobile Hotspot Controller may consider the WWAN modem to be in High Mobility state.

The Mobile Hotspot Controller may receive the cell change indication from the WWAN modem whenever it performs a cell change. Based on how frequently cell changes occur and based on the cell identities, the Mobile Hotspot Controller may determine the Mobility state of the mobile Hotspot device as specified above. The Mobile Hotspot Controller may receive other additional information, e.g., Doppler spread estimate, from WWAN modem to further help determine the Mobility state of the mobile Hotspot device. Example values for the various thresholds used in the Mobility state detection are listed in the table contained in FIG. 9. The values for the thresholds may be fine tuned through simulations and filed testing.

The third of the four power saving criteria, whether a client device is connected to the mobile Hotspot, may have one of two possible status as follows:

(1) No active client device connected with mobile Hotspot.

(2) One or more active client devices connected with mobile Hotspot.

When there is no active client device connected to the mobile Hotspot then there may not be any active Internet Protocol (IP) data transfer. There may be other types of data transfers, such as Short Message Service (SMS). For the present disclosure, any type of data transfer is referred to as IP data transfer. Sometimes even when the client devices are connected to the mobile Hotspot, there may not be any active IP data transfer if the client device is not running any IP based applications. When the client devices are connected with the mobile Hotspot, most of the time there may be continued IP data transfer in DL, UL or both DL and UL.

The last of the four power saving criteria, the IP data connection status of any client device connected to the mobile Hotspot, may be categorized as follows:

(1) No client device connection and No active IP data transfer.

(2) One or more client devices connected and No active IP data transfer.

(3) One or more client devices connected and active IP data transfer.

The realization of power saving by using the four power saving criteria for different scenarios is described next.

According to an aspect of the present disclosure, when the mobile broadband network releases the IP data connection with the WWAN modem, the WWAN modem may notify the Mobile Hotspot Controller that the IP data connection is released and then the WWAN modem may enter into Idle DRX mode.

The IP data connection between the mobile broadband network and the WWAN modem may be released by the WWAN modem implicitly without the mobile broadband network being aware about it. This release of the IP data connection by the WWAN modem may be triggered by the Mobile Hotspot Controller. According to an aspect of the present disclosure, the Mobile Hotspot Controller may maintain a timer of duration Tdi_c, when the WWAN modem is in Connected mode, to monitor the IP data connection status in the mobile Hotspot device and track the IP data transfer. According to an aspect of the present disclosure, the Mobile Hotspot Controller may send commands, such as AT commands, to the WWAN modem to release the IP data connection with the mobile broadband network when there is no active IP data transfer for time duration Tdi_c. The WWAN modem may transition from Connected mode to Idle DRX mode after releasing the IP data connection. According to an aspect of the present disclosure, the monitoring of the IP data connection and tracking of IP data transfer may be implemented in the WWAN modem instead of the Mobile Hotspot Controller. The WWAN modem may timeout after time duration Tdi_c if there is no IP data transfer observed by the controller in the WWAN modem and then it may autonomously release the IP data connection with the mobile broadband network and notify the Mobile Hotspot Controller. The time duration Tdi_c may be configurable and its value may be optimized using simulation, lab testing and field testing.

According to an aspect of the present disclosure, the Mobile Hotspot Controller may maintain a timer of duration Tdi_drx, when the WWAN modem is in Idle DRX mode, to monitor the IP data connection in the mobile Hotspot device and track the IP data transfer. According to an aspect of the present disclosure, the Mobile Hotspot Controller may send commands, such as AT commands, to the WWAN modem to transition from Idle DRX mode to Sleep mode if there is no IP data transfer for time duration Tdi_drx. According to an aspect of the present disclosure, the monitoring of the IP data connection and tracking of IP data transfer may be implemented in the WWAN modem instead of the Mobile Hotspot Controller. The WWAN modem may timeout after time duration Tdi_drx if there is no IP data transfer observed by the controller in the WWAN modem and then it may autonomously transition from Idle DRX mode to Sleep mode and may notify the Mobile Hotspot Controller. The time duration Tdi_drx may be configurable and its value may be optimized using simulation, lab testing and field testing.

According to an aspect of the present disclosure, the Mobile Hotspot Controller may maintain a timer of duration Tnc_c to track whether one or more WLAN client devices are connected with the WLAN AP. According to an aspect of the present disclosure, if there is no active WLAN client device connected to the WLAN AP in the mobile Hotspot for a time duration of Tnc_c and no other client devices (e.g., over Bluetooth, USB, etc.) connected to mobile Hotspot, when the WWAN modem is in Connected mode, then the Mobile Hotspot Controller may send commands, such as AT commands, to WWAN modem to release the connection with the mobile broadband network. The WWAN modem may transition from Connected mode to Idle DRX mode after releasing the connection with the mobile broadband network. According to an aspect of the present disclosure, time duration Tnc_c may be less than or equal to time duration Tdi_drx. The time duration Tnc_c may be configurable and its value may be optimized using simulation, lab testing and field testing. Note that apart from the reasons specified above, the WWAN modem may enter into Idle DRX mode for various other reasons as well, e.g., no service, link loss, etc. These reasons for entry to Idle DRX mode are internal to the WWAN modem and may not be triggered by the Mobile Hotspot Controller. Regardless of the trigger for change of operating mode transition, the WWAN modem may always inform the Mobile Hotspot Controller about the change of WWAN operating mode.

According to an aspect of the present disclosure, the Mobile Hotspot Controller may maintain a timer of duration Tnc_drx to track the number of WLAN client devices connected with the WLAN AP. According to an aspect of the present disclosure, if there is no active WLAN client device connected for a time duration of Tnc_drx and no other client devices (e.g., over Bluetooth, USB, etc.) are connected to mobile Hotspot, when the WWAN modem is in Idle DRX mode, then the Mobile Hotspot Controller may send commands, such as AT commands, to WWAN modem to transition from Idle DRX mode to Sleep mode.

The table contained in FIG. 10 lists various scenarios that may allow independent power saving in the WWAN modem and WLAN modem subsystems and can be handled according to the aspects of the present disclosure.

According to an aspect of the present disclosure, as specified in the table contained in FIG. 10, there may be nine possible scenarios for power saving in the Mobile Hotspot Controller based on the three of the four power saving criteria, Mobility state, client device connection status, and client device IP data connection status, as illustrated in the columns titled "Mobility state", "WLAN/USB/Bluetooth Client Device Connection Status", and "WLAN/USB/Bluetooth Client Device Active IP data Transfer Status" in FIG. 10. According to an aspect of the present disclosure, based on the prevailing scenario for power saving, the Mobile Hotspot Controller may determine the WWAN modem Idle DRX cycle duration. According to an aspect of the present disclosure, whenever there is a change from one scenario to another (out of the nine different possible scenarios), the Mobile Hotspot Controller may configure the WWAN modem with the WWAN modem Idle DRX cycle optimized for that particular scenario as specified in the column "Idle DRX cycle" of the table contained in FIG. 10. In the table contained in FIG. 10, the column titled "Trigger for Connected mode to Idle DRX mode Transition" indicates the timer expiry that may cause transition from Connected mode to Idle DRX mode for each scenario. The column titled "Trigger for Idle DRX mode to Sleep mode Transition" indicates the timer expiry that may cause transition from Idle DRX mode to Sleep mode for each scenario.

Example numeric values for the "Idle DRX cycle" for the symbolic values listed in the table contained in FIG. 10 are specified in the table contained in FIG. 11. In the Idle DRX mode, the sleep and wake-up events for the WWAN modem are controlled autonomously by the WWAN modem controller, rather than by the Mobile Hotspot Controller, as per the configured Idle DRX cycle. Typically it ranges from few hundred milliseconds to few seconds. For example, in the case of 3GPP LTE wireless communication client device, the Idle DRX cycle values can be 320 ms, 640 ms, 1.28 s, 2.56 s and so on.

When the Mobile Hotspot Controller configures the WWAN modem Idle DRX cycle, the WWAN modem may communicate that to the WWAN and request for change in Idle DRX cycle. According to an aspect of the present disclosure, when the WWAN modem gets acknowledgement from the mobile broadband network, the WWAN modem controller may confirm the change in Idle DRX cycle to the Mobile Hotspot Controller. The change in WWAN modem Idle DRX cycle based on the mobile Hotspot scenario may increase the duration in standby sub-mode in Idle DRX mode of the WWAN modem controller and hence may reduce the power consumption in the mobile Hotspot.

According to an aspect of the present disclosure, when the Mobile Hotspot Controller determines that one or more client devices may be initiating a connection to the mobile Hotspot and if the WWAN modem is in Idle DRX mode at that time, the Mobile Hotspot Controller may send a request to the WWAN modem to connect with the mobile broadband network to establish IP connection.

According to an aspect of the present disclosure, when the Mobile Hotspot Controller determines that IP data transfer may be initiated from one or more of the already connected client devices and if the WWAN modem is in Idle DRX mode at that time, the Mobile Hotspot Controller may send a request to the WWAN modem to connect with the mobile broadband network to establish the IP connection. In this scenario, the Mobile Hotspot Controller may wait for the WWAN modem to establish the connection with the mobile broadband network and wait for the notification from WWAN modem for successful connection establishment before sending the IP data transfer request to the WWAN modem.

The table contained in FIG. 12 lists the different operating modes of the WWAN modem and the various triggers to transition from one mode to another. The transitions from Sleep mode to Idle DRX mode and from Idle DRX mode to Connected mode, are conventional mode transitions (first and second row after header row in the table contained in FIG. 12). According to an aspect of the present disclosure, the transition from Idle DRX mode to Sleep mode may be triggered as per the events specified in the table contained in FIG. 12. The listed events correspond to different timers and counters configured as per the different status of the three of the four power saving criteria Mobility state, WLAN client connection status, and WLAN client device IP data connection status as per the table contained in FIG. 10. Example values for each of the timers (e.g., Tnc_drx, etc.) listed in the table contained in FIG. 12 are listed in the table contained in FIG. 13A. Example values for each of the counters (e.g., $NDRX_{nm\_ac}$, etc.) listed in the table contained in FIG. 12 are listed in the table contained in FIG. 13B. For example, the counter $NDRX_{nm\_ac}$ corresponds to the number of $IDLE\_DRX_{nm\_nc}$ cycles for which there is no connection from WLAN client observed by the WLAN AP. When this count is reached, the Mobile Hotspot Controller may configure the WWAN modem to enter Sleep mode. The default value for the counter $NDRX_{nm\_ac}$ is 100 as per the table contained in FIG. 13B. The values for the counters and timers may be fine tuned through simulations, lab testing and filed testing. Note that the state transition tables in FIG. 12 and FIG. 10 correspond to the same innovative aspects. The table contained in FIG. 10 provides further details on how some of the timers and counters mentioned in FIG. 12 are used for various state transitions.

Figure 4:
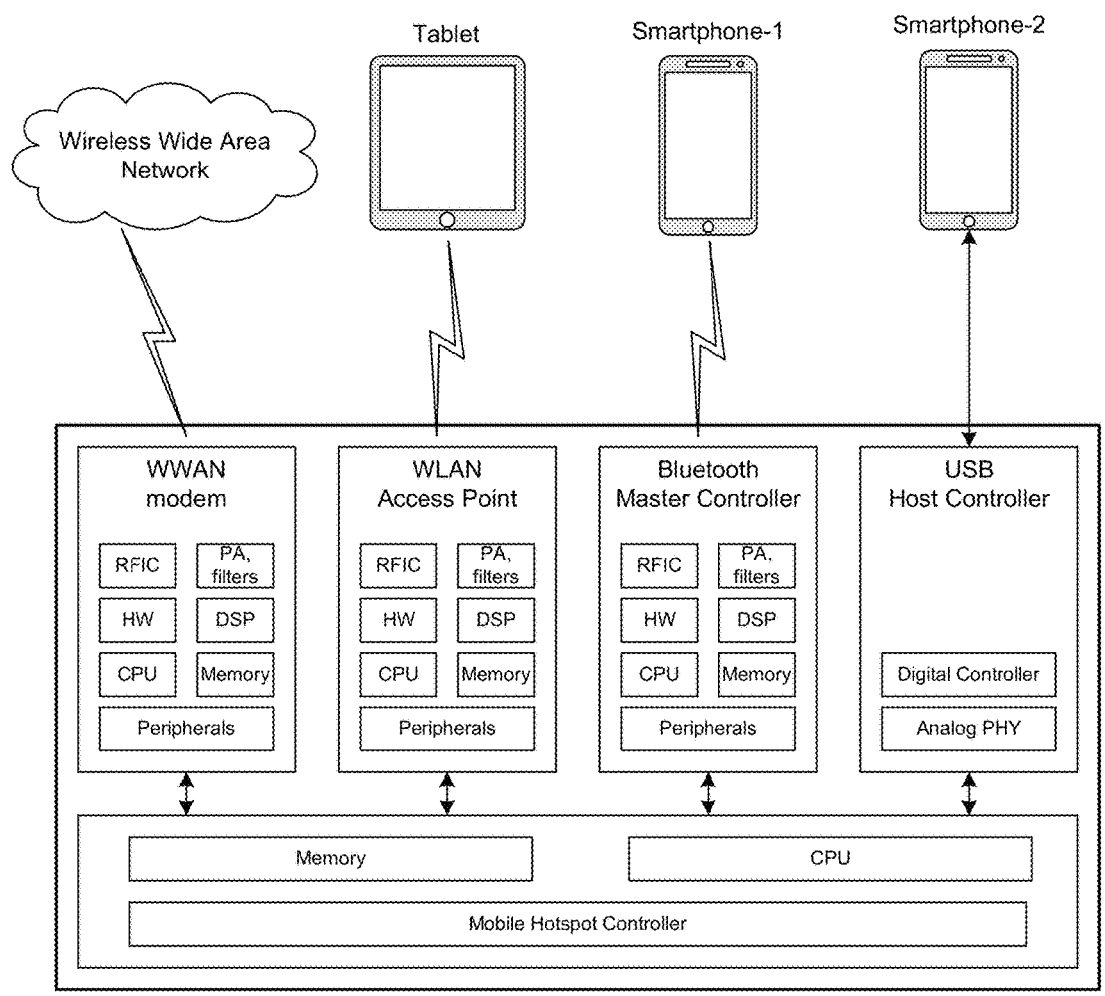
FIG. 4 illustrates a high level block diagram of an example mobile Hotspot device with separate modems and CPUs for mobile broadband modem, WLAN Access Point, Bluetooth Master Controller, and Universal Serial Bus (USB) Host Controller.
Figure 5:
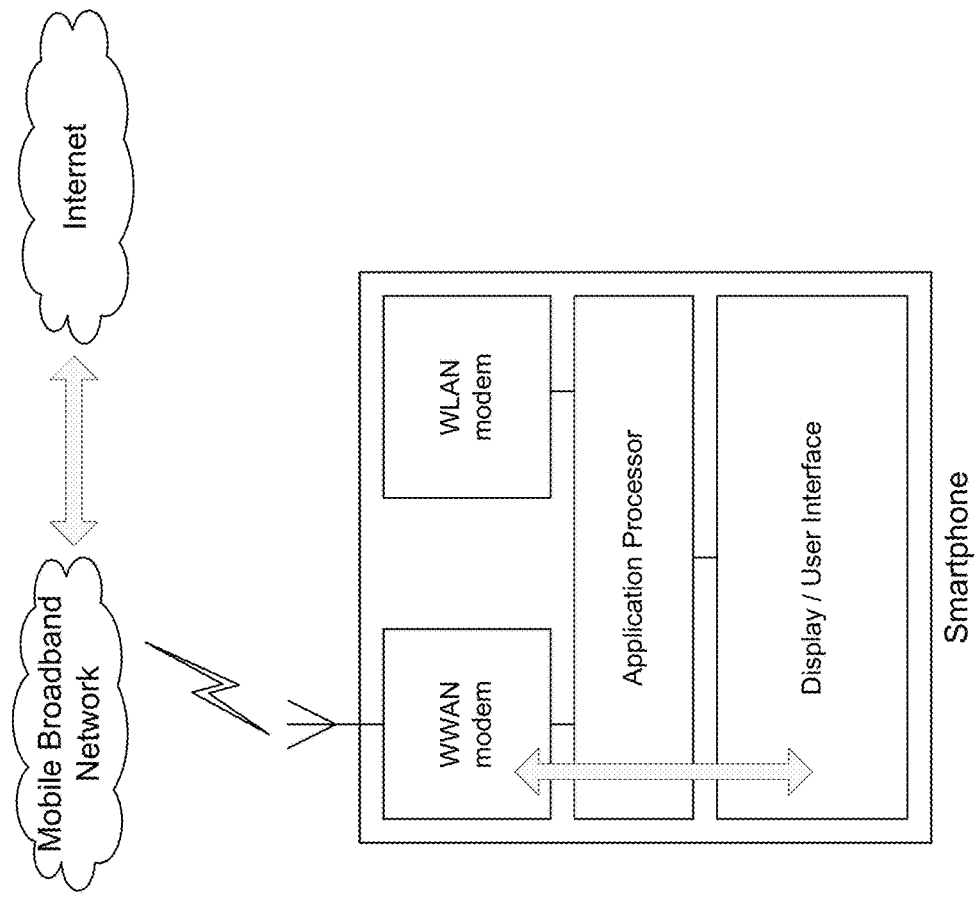
FIG. 5 illustrates a use case of internet access over a mobile broadband network by a smartphone client device.
Figure 6:
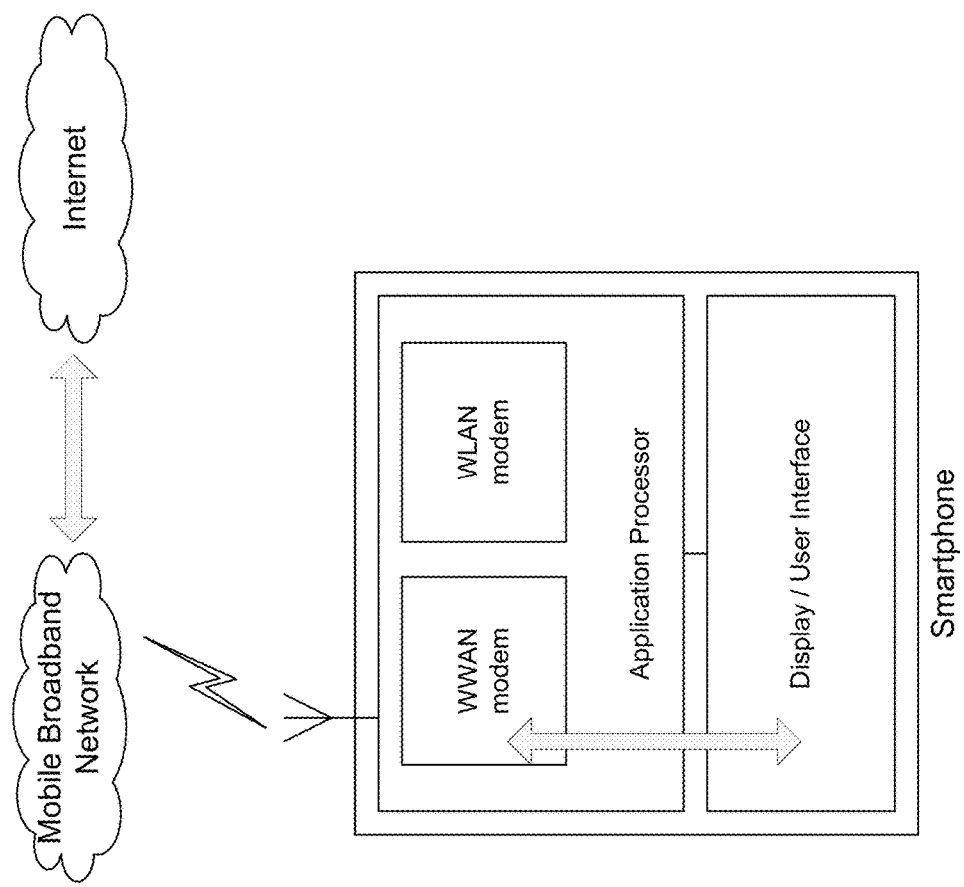
FIG. 6 illustrates a use case of internet access over a mobile broadband network by a smartphone client device with an integrated WWAN modem, WLAN modem, and Application Processor.
Figure 7:
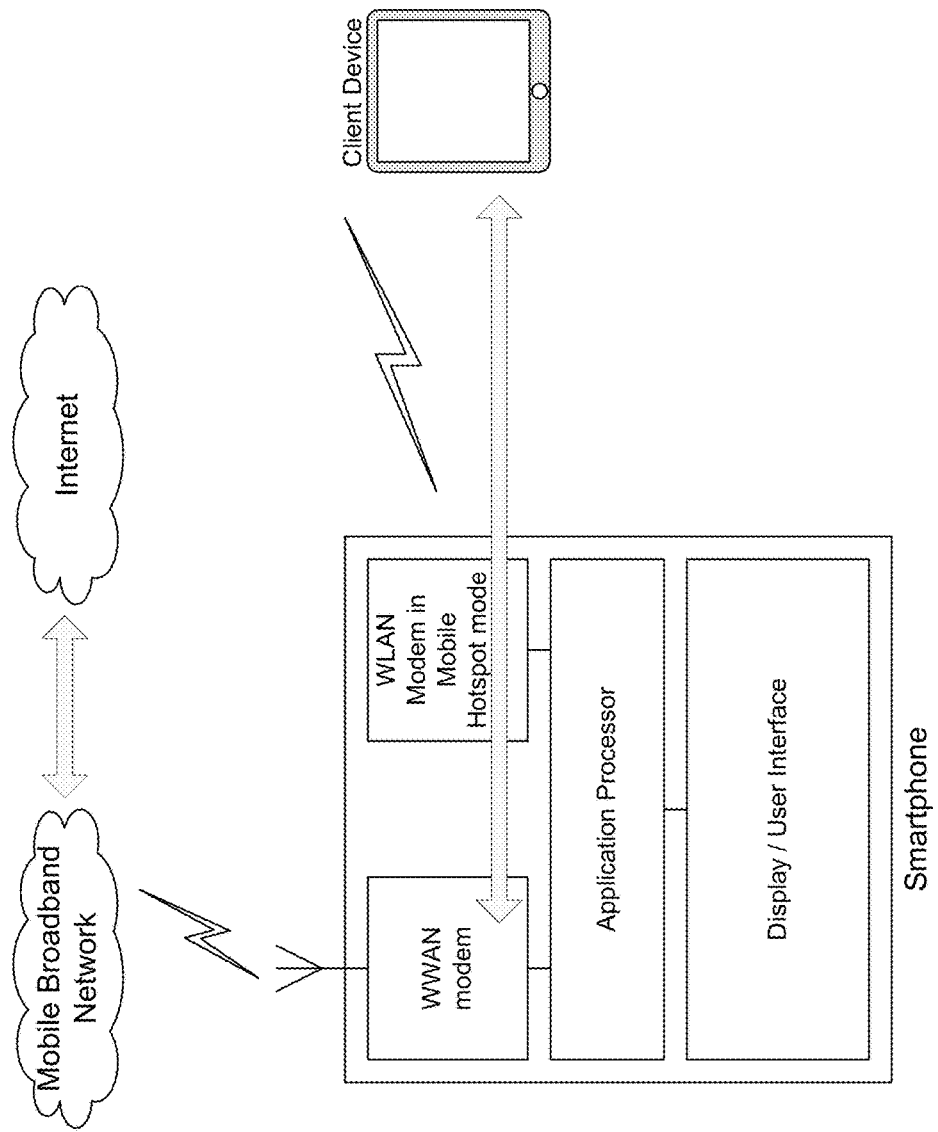
FIG. 7 illustrates a use case of internet access over a WLAN network by a client device through a smartphone operating in mobile Hotspot mode.
Figure 8:
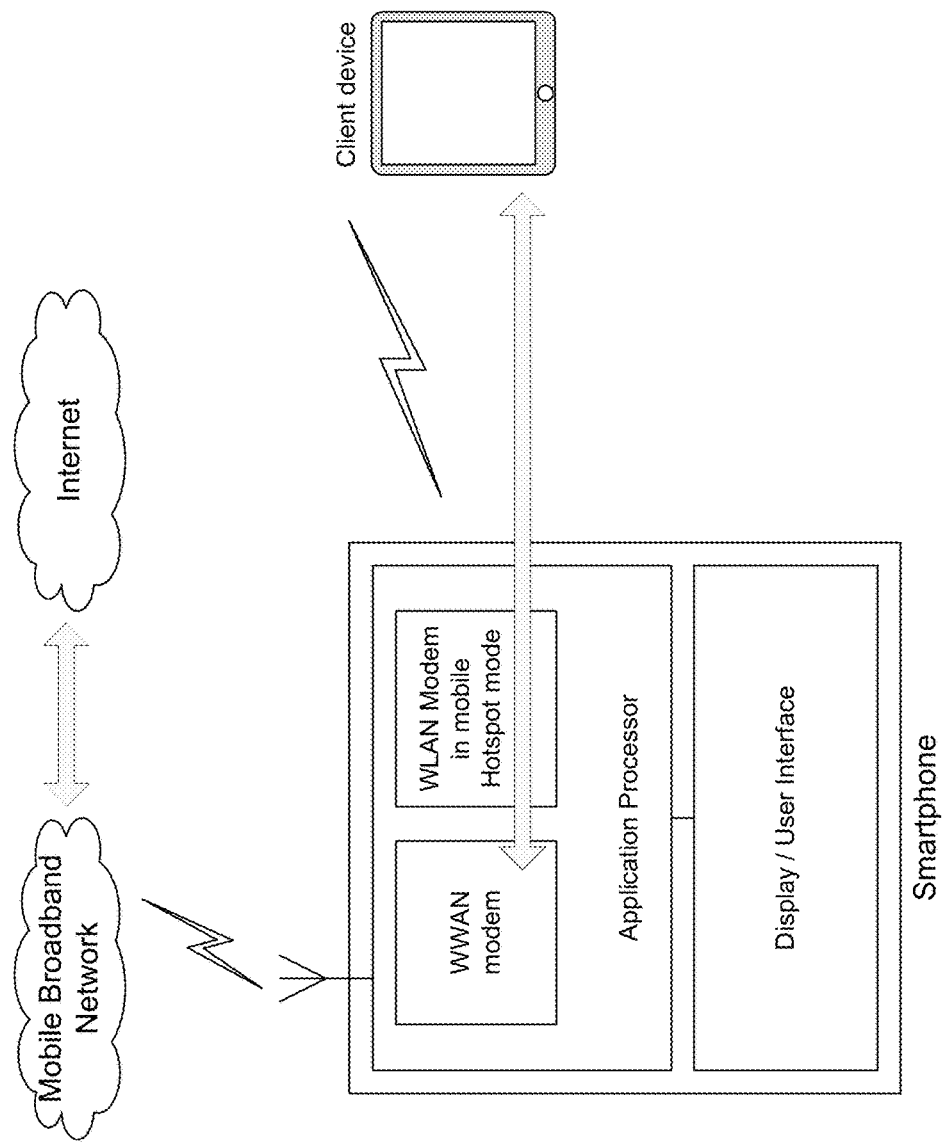
FIG. 8 illustrates a use case of internet access over a WLAN network by a client device through a smartphone operating in mobile Hotspot mode with an integrated WWAN modem, WLAN Access Point, and Application Processor.

According to an aspect of the present disclosure, a mobile Hotspot device may have more than one type of client devices connected to it to obtain internet service. For example, the mobile Hotspot device may provide internet connection to WLAN client devices and simultaneously other client devices may be connected to the same mobile Hotspot for internet service through USB port or other short range wireless communication subsystems such as Bluetooth™, etc. An example block diagram of such a mobile Hotspot device is shown in FIG. 4. According to an aspect of the present disclosure, if client devices with more than one type of short range communication subsystems such as WLAN, USB, Bluetooth, etc. are connected to a mobile Hotspot device, then the Mobile Hotspot Controller may configure WWAN subsystem to Idle DRX mode or Sleep mode only when there is no client device connected to any of the subsystems and no active data transfer is ongoing in any of the client devices connected to any of the short range communication subsystems.

According to the aspects of the present disclosure, the WLAN AP may be operated in two modes: Active mode and Sleep mode. In Active mode, (i) the WLAN AP may be broadcasting the beacon signal to enable the WLAN client devices to detect the presence of the WLAN AP, (ii) the WLAN AP may have one or more WLAN client devices connected to it but no active IP data transfer may be ongoing, and (iii) the WLAN AP may also be involved in active IP data transfer with one or more WLAN client devices. In Sleep mode, the WLAN AP may be powered off and may not perform any receive or transmit operations. There may be similar Active and Sleep modes for other short range communication subsystems such as Bluetooth and USB.

According to an aspect of the present disclosure, when a client device is connected with mobile Hotspot over USB or Bluetooth or any other connectivity interfaces, and in active DL and/or UL data transfer, and when there is no WLAN client device connected with WLAN AP for time duration Twf_nc, then Mobile Hotspot Controller may configure the WLAN AP subsystem to enter into Sleep mode while the WWAN subsystem may be in Connected mode. This aspect may be applicable to a modem for any short range communication subsystem of a mobile Hotspot for which client devices are not actively connected with it, i.e., that modem subsystem in the mobile Hotspot device may be configured by the Mobile Hotspot Controller to enter into Sleep mode with the periodicity configured by the Mobile Hotspot Controller. The periodicity may be different for different modem subsystems in the mobile Hotspot device. Example numeric value for the timer of duration Twf_nc is provided in the table contained in FIG. 13A.

According to an aspect of the present disclosure, (i) when a client device is connected with mobile Hotspot over USB or Bluetooth or any other connectivity interfaces and is performing active IP data transfer, and (ii) when there are WLAN client devices connected with WLAN AP but there is no active IP data transfer initiated by any of the WLAN client devices for time duration Twf_drx, then Mobile Hotspot Controller may configure the WLAN AP subsystem to enter into Sleep mode while the WWAN subsystem may be in Connected mode. This aspect may be applicable to a modem for any short range communication subsystem for which client devices are not actively connected with it, i.e., that modem subsystem in the mobile Hotspot device may be configured by the Mobile Hotspot Controller to enter into Sleep mode with the periodicity configured by the Mobile Hotspot Controller. The periodicity may be different for different modem subsystems in the mobile Hotspot device. Example numeric value for the timer duration Twf_drx is provided in the table contained in FIG. 13A.

According to an aspect of the present disclosure, when a client device is connected through USB connectivity interface with the mobile Hotspot device and for time duration Tusb if there is no active DL and/or UL data transfer, the Mobile Hotspot Controller may send notification to its USB subsystem to suspend the USB interface. According to an aspect of the present disclosure, when the USB subsystem is suspended, and if the other modem subsystems in the mobile Hotspot are not having any client devices connected to them, then the Mobile Hotspot Controller may configure the WWAN modem to enter Sleep mode. Example numeric value for the time duration Tusb is provided in the table contained in FIG. 13A.

When a client device that is connected through USB connectivity interface with the mobile Hotspot device and is in suspend mode, and it initiates any DL and/or UL data transfer then the client device may resume the connection (i.e., get out of suspend mode) with the USB subsystem in the mobile Hotspot device. When the USB subsystem moves from suspend mode to resume mode, the Mobile Hotspot Controller may send commands, such as AT commands, to WWAN modem subsystem to wake-up from Sleep mode and transition to Connected mode.

The realization of the power savings in a mobile Hotspot based on the four power saving criteria according to the aspects of the present disclosure may depend on the specific details of mobile Hotspot architecture, hardware, software, etc. A mobile Hotspot device may comprise, for example, two major subsystems, namely WWAN modem and WLAN AP as illustrated FIG. 2. The WWAN modem subsystem may include, as illustrated in FIG. 2, hardware (HW) such as accelerators and Digital Signal Processors (DSPs) for physical (PHY) layer implementation of the WWAN modem, a Central Processing Unit (CPU) for executing WWAN communication protocols software (SW), Radio Frequency Integrated Circuit (RFIC) for transmission and reception over WWAN RF channels, one or more Power Amplifiers (PAs), filters, switches, and peripherals such as memory and connectivity interfaces such as Universal Serial Bus (USB), Universal Asynchronous Receiver Transmitter (UART), Secure Digital Input Output (SDIO), etc.

Figure 2:
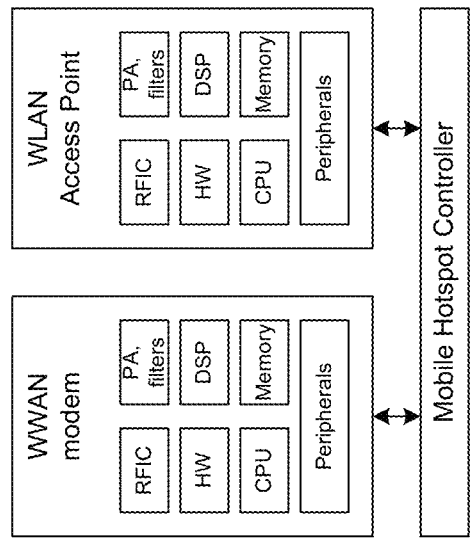
FIG. 2 illustrates a high level block diagram of an example mobile Hotspot device with separate modems and Central Processing Unit (CPUs) for Wireless Wide Area Network (WWAN) and WLAN Access Point (mobile Hotspot Configuration1).

The WLAN AP modem subsystem may include, as illustrated in FIG. 2, hardware such as accelerators and DSPs for the physical (PHY) layer implementation of the WLAN modem, CPU for executing wireless communication protocols SW, RFIC for transmission and reception over WLAN RF channels, one or more power amplifiers, filters, switches, and peripherals such as memory interfaces and connectivity interfaces such as USB, SDIO, UART, etc.

In an example mobile Hotspot device with two major modem subsystems, the mobile Hotspot architecture, hardware, and software may have at least two different configurations. In the first mobile Hotspot (MHSP) configuration, referred herein as MHSP Configuration1, as illustrated in FIG. 2, the mobile Hotspot device may have two separate processors or CPUs, memory controllers, and connectivity peripherals. One set of CPU, memory controller, and peripherals may be dedicated for the WWAN modem subsystem and another set of CPU, memory controller, and peripherals may be dedicated for the WLAN AP modem subsystem. In this design, the sleep and wake-up events may be planned for the two modem subsystems independent of each other to achieve the overall power savings in the mobile Hotspot device according to the aspects of the present disclosure.

Figure 3:
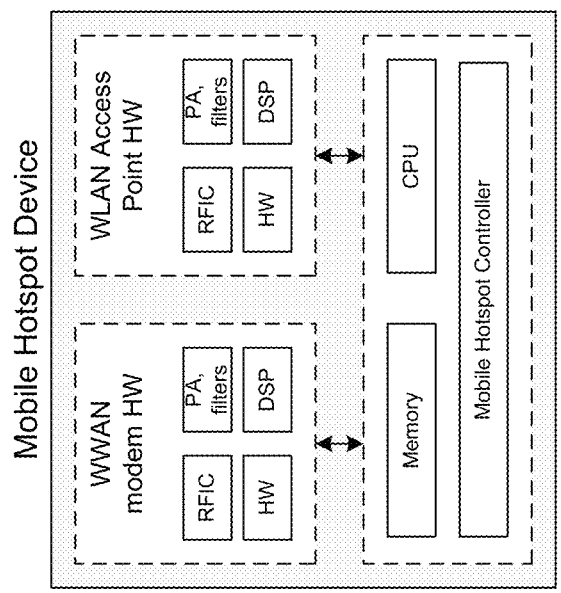
FIG. 3 illustrates a high level block diagram of an example mobile Hotspot device with an integrated WWAN modem and WLAN Access Point (mobile Hotspot Configuration2).

In the second mobile Hotspot configuration, referred herein as MHSP Configuration2, as illustrated in FIG. 3, the mobile Hotspot device may have only one set of CPU, memory controller, and peripherals which may be shared with the WWAN modem hardware and the WLAN AP modem hardware. Note that in the MHSP Configuration2, some of the functionality, such as execution of protocol SW, of the two modem subsystems shown in MHSP Configuration1 has been moved to the common CPU, memory controller and peripherals. Therefore, in MHSP Configuration2, these subsystems are referred to as WWAN modem hardware and WLAN AP modem hardware. In this context the term "modem hardware" corresponds to all the RF and baseband processing elements required for implementing physical (PHY) layer functions of a modem. The modem hardware may include units such as accelerators, DSPs, firmware, memory, RFICs, power amplifiers, and any other element required for implementing the physical (PHY) layer functions of a modem. Since the sleep and wake-up events of the WWAN modem hardware and the WLAN AP modem hardware may be asynchronous to each other, the management of power savings of the shared resources in MHSP Configuration2, i.e., CPU, memory controller, peripherals, etc., may be more complex and constrained compared to the MHSP Configuration1. Although the CPU, memory controller, peripherals, etc., may be shared between the two modems, the modem hardware may be separate for each modem and may not be shared. Therefore, the power management for the relevant elements of each modem may be done independent of the other modem to achieve power savings.

Considering the four power saving criteria, namely, WWAN modem operating mode, the Mobility state, the number of client devices connected to mobile Hotspot, and the IP data connection status of the client devices, the mobile Hotspot device may be in, among others, one of following scenarios:

S1. In this scenario, both WWAN modem subsystem and the WLAN AP subsystem may be in Sleep mode. In this case only the user interface indicators such as Light Emitting Diodes (LEDs), Liquid Crystal Display (LCD), key peripherals such as power on/off button, etc. may be active.

S2. In this scenario, only the WWAN modem subsystem may be in Sleep mode and WLAN AP subsystem may be in Active mode. In this scenario, there are two possible sub-scenarios as follows: (i) active WLAN client devices connected to WLAN AP (ii) no active WLAN client device connected to WLAN AP.

S3. In this scenario, only the WLAN AP subsystem may be in Sleep mode and WWAN modem subsystem may be in Idle DRX mode or Connected mode. For example, WLAN AP may be in Sleep mode and WWAN modem may be connected to the mobile broadband network for WWAN connection maintenance or for other procedures such as Over the Air Device Management (OTADM), periodic network registration update, etc.

S4. In this scenario, neither the WWAN modem subsystem nor the WLAN AP subsystem may be in Sleep mode. They may be either in Connected mode or in Idle DRX mode. This may be a typical scenario for the mobile Hotspot device. In this scenario, following sub-scenarios may be possible:
  i. WWAN modem subsystem may be in Idle DRX mode and WLAN AP subsystem may be in Active mode:
     a. With active WLAN client devices connected to WLAN AP.
     b. Without active client devices connected to WLAN AP.
  ii. WWAN modem subsystem may be in Connected mode and WLAN AP subsystem may be in Active mode:
     a. With active WLAN client devices connected to WLAN AP.
     b. Without active clients connected to WLAN AP.

Examples of power saving realization in the mobile Hotspot device according to the aspects of the present disclosure are illustrated next for the some of the scenarios described above for the two example MHSP configurations illustrated in FIG. 2 and FIG. 3. It is to be understood that similar power saving realization in the mobile Hotspot device may be achieved for other scenarios that may not be explicitly identified in the present disclosure. Among the timing waveforms contained in FIGS. 14 to 20, the "WWAN MODEM PHY and Radio" timing waveform is illustrated to be in ON or OFF state. The OFF state corresponds to either the WWAN modem Sleep mode or the WWAN modem in standby sub-mode of the Idle DRX mode. The ON state corresponds to either the WWAN modem Connected mode or the WWAN modem in monitoring sub-mode of the Idle DRX mode. Similarly, the "WLAN AP PHY and Radio" timing waveform is illustrated to be in ON or OFF state. The OFF state corresponds to the WLAN AP Sleep mode. The ON state corresponds to either the WLAN AP in Active mode with or without WLAN client devices connected to it and with or without active IP data transfer with the client devices.

Figure 14:
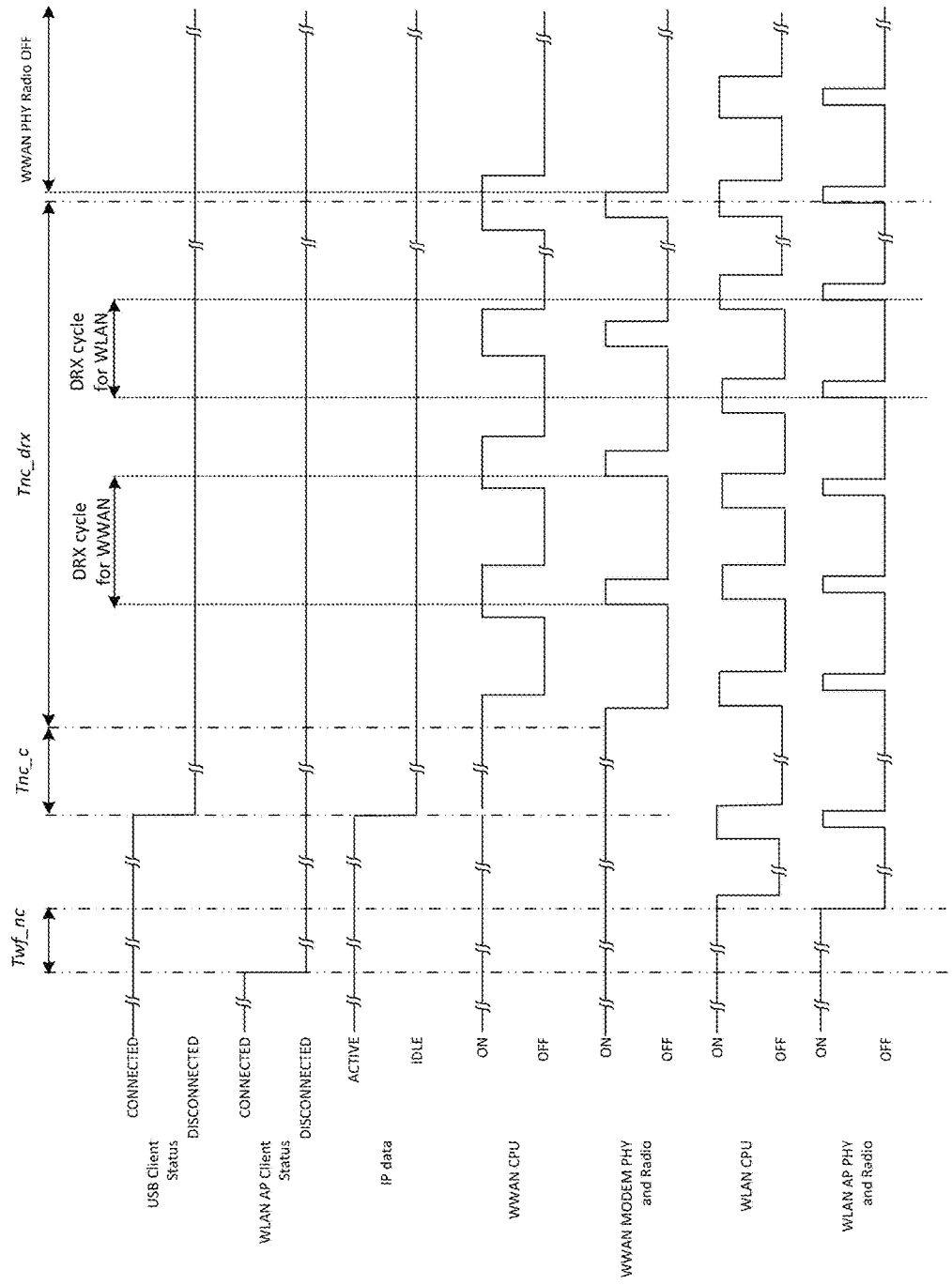
FIG. 14 illustrates the sequence events and actions according to the aspects of the present disclosure for Mobile Hotspot (MHSP) Configuration1 for handling the scenario in which the WLAN client devices disconnect from WLAN Access Point (AP) but the USB client devices are active.

FIG. 14 illustrates the sequence of events and actions according to the aspects of the present disclosure for MHSP Configuration1 for handling the scenario in which the WLAN client devices may not be connected to WLAN AP but the client devices connected through USB connectivity interface may be active. In this case the WLAN AP may enter WLAN Idle DRX mode. When both the WLAN client devices and the client devices connected through USB connectivity interface disconnect from the mobile Hotspot, the WWAN modem may enter Idle DRX mode. Eventually, when the timer of duration Tnc_drx expires, the WWAN modem may enter Sleep mode.

Figure 15:
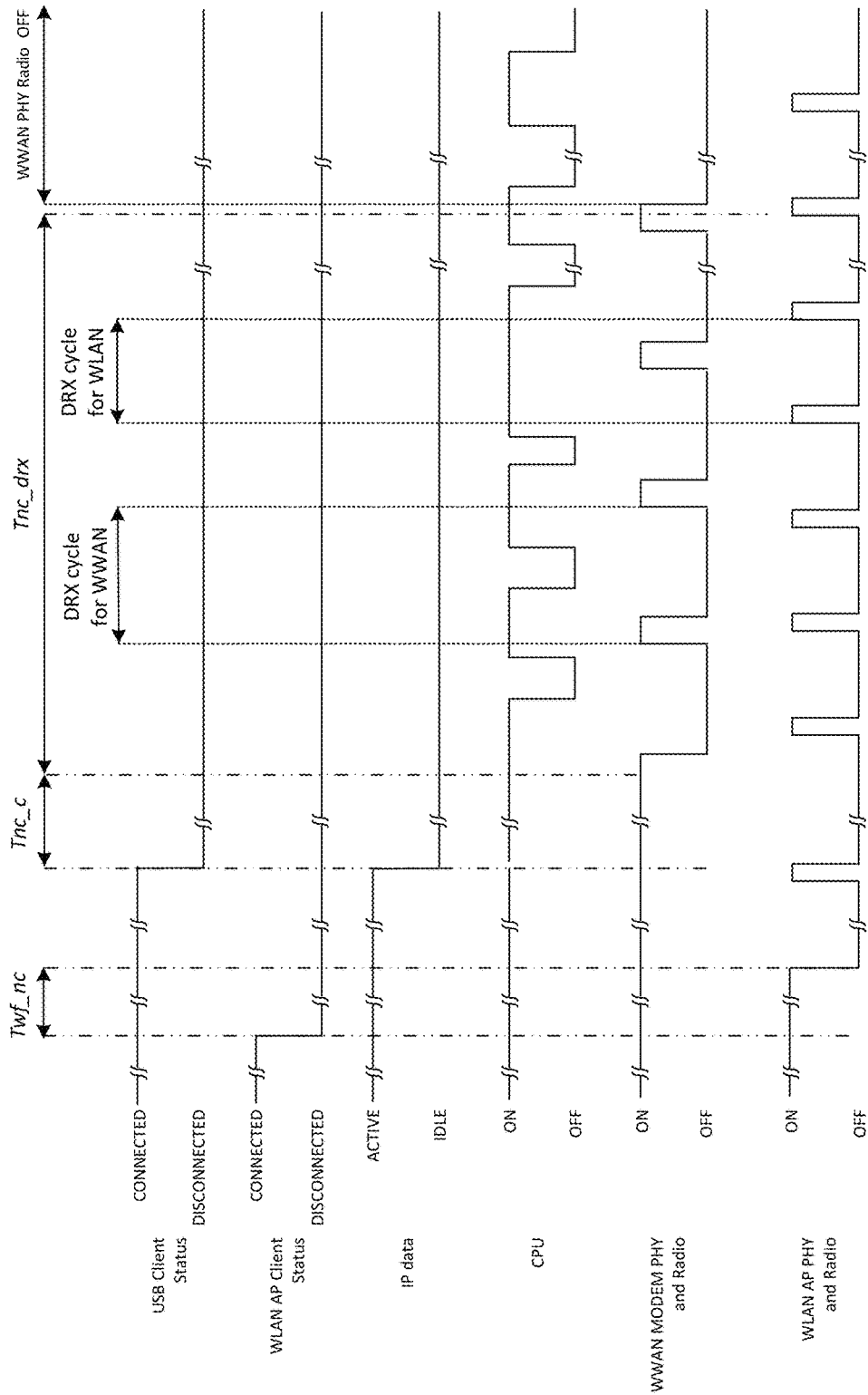
FIG. 15 illustrates the sequence events and actions according to the aspects of the present disclosure for MHSP Configuration2 for handling the scenario in which the WLAN client devices disconnect from WLAN AP but the USB client devices are active.

FIG. 15 illustrates the sequence of events and actions according to the aspects of the present disclosure for MHSP Configuration2 for handling the scenario in which the WLAN client devices may not be connected to WLAN AP but the client devices connected through USB connectivity interface may be active. In this case the WLAN AP may enter WLAN Idle DRX mode. When both the WLAN client devices and the client devices connected through USB connectivity interface disconnect from the mobile Hotspot, the WWAN modem may enter Idle DRX mode. Eventually, when the timer of duration Tnc_drx expires, the WWAN modem enters Sleep mode.

Figure 16:
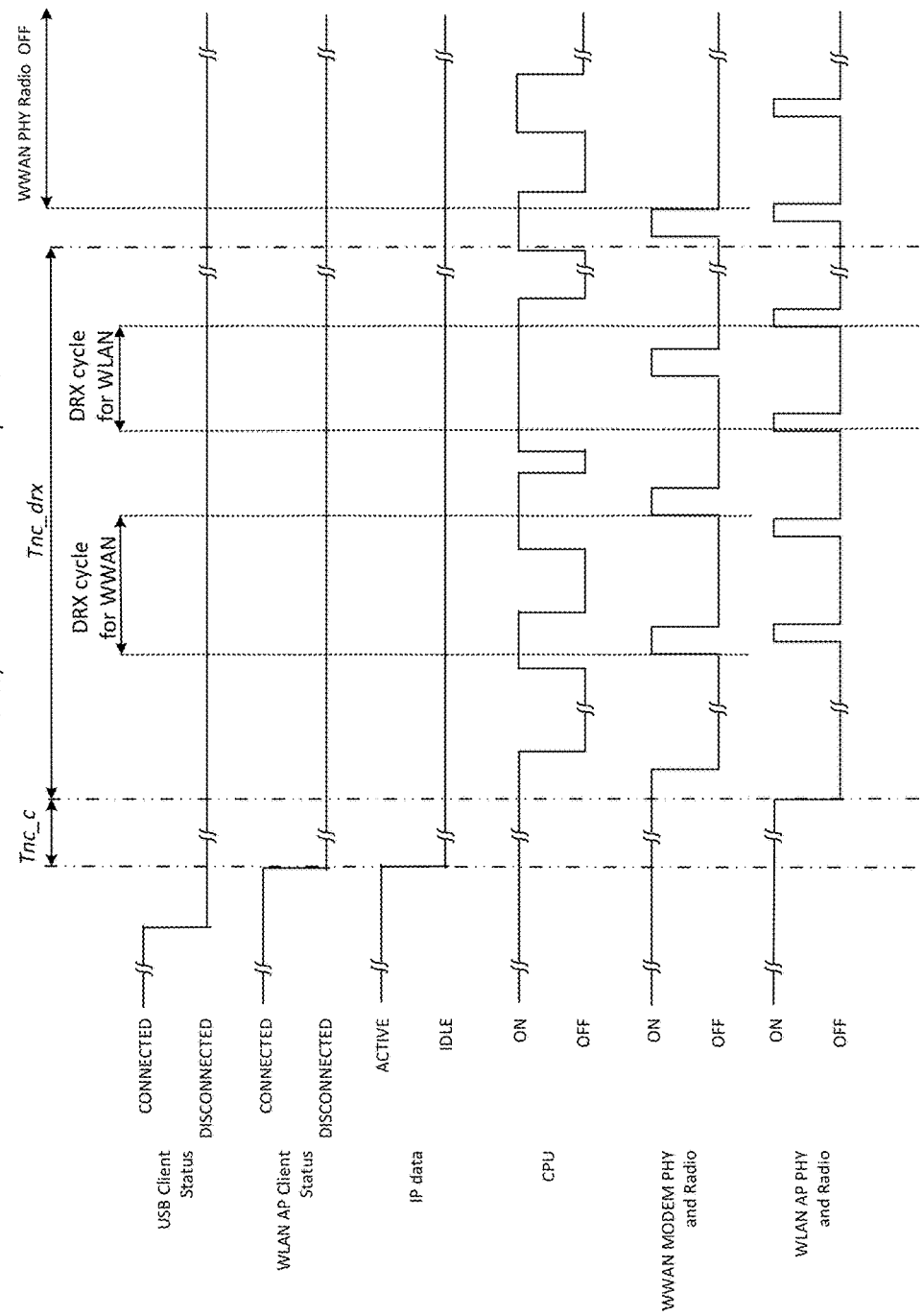
FIG. 16 illustrates the sequence events and actions according to the aspects of the present disclosure for MHSP Configuration2 for handling the scenario in which the USB client device disconnects first and then WLAN client devices disconnect from the mobile Hotspot.

FIG. 16 illustrates the sequence of events and actions according to the aspects of the present disclosure for MHSP Configuration2 for handling the scenario in which the client device connected through USB connectivity interface may disconnect first and then WLAN client devices may disconnect from the mobile Hotspot. Then the WLAN AP may enter WLAN Idle DRX mode. Finally, the WWAN modem may enter Idle DRX mode. Eventually, when the timer of duration Tnc_drx expires, the WWAN modem may enter Sleep mode.

Figure 17:
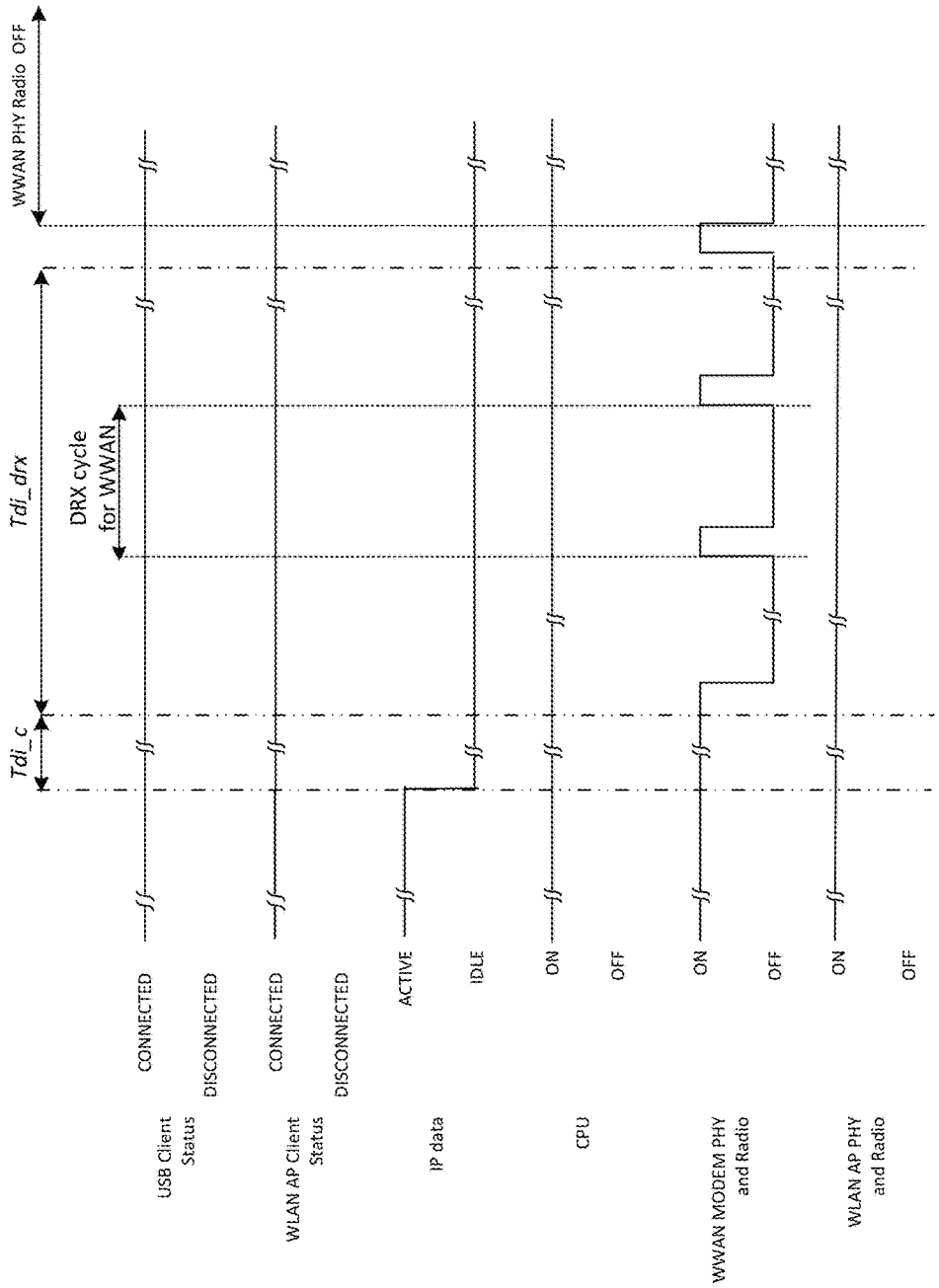
FIG. 17 illustrates the sequence events and actions according to the aspects of the present disclosure for MHSP Configuration2 for handling the scenario in which the USB client device and the WLAN client devices are actively connected to the mobile Hotspot but there is no IP data transfer.

FIG. 17 illustrates the sequence of events and actions according to the aspects of the present disclosure for MHSP Configuration2 for handling the scenario in which the client device is connected through USB connectivity interface and the WLAN client devices may be actively connected to the mobile Hotspot. However, there may not be IP data transfer between the client devices and the mobile Hotspot. In this case, the WWAN modem may enter Idle DRX mode. Eventually, when the timer of duration Tdi_drx expires, the WWAN modem may enter Sleep mode.

Figure 18:
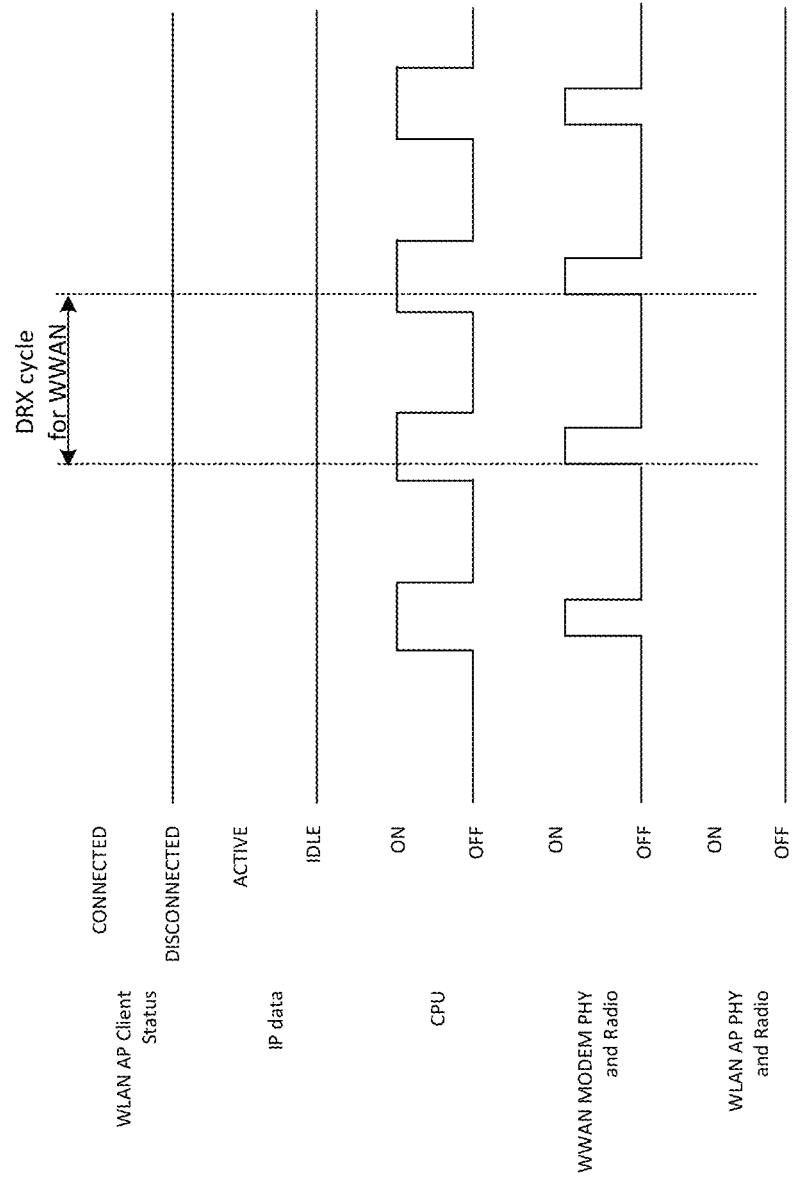
FIG. 18 illustrates the sequence events and actions according to the aspects of the present disclosure for MHSP Configuration2 for handling the scenario in which all the WLAN client devices are in Sleep mode.

FIG. 18 illustrates the sequence of events and actions according to the aspects of the present disclosure for MHSP Configuration2 for handling the scenario in which all the WLAN client devices may be in Sleep mode. However, the WWAN modem may be in Idle DRX mode or Connected mode performing WWAN connection maintenance.

Figure 19:
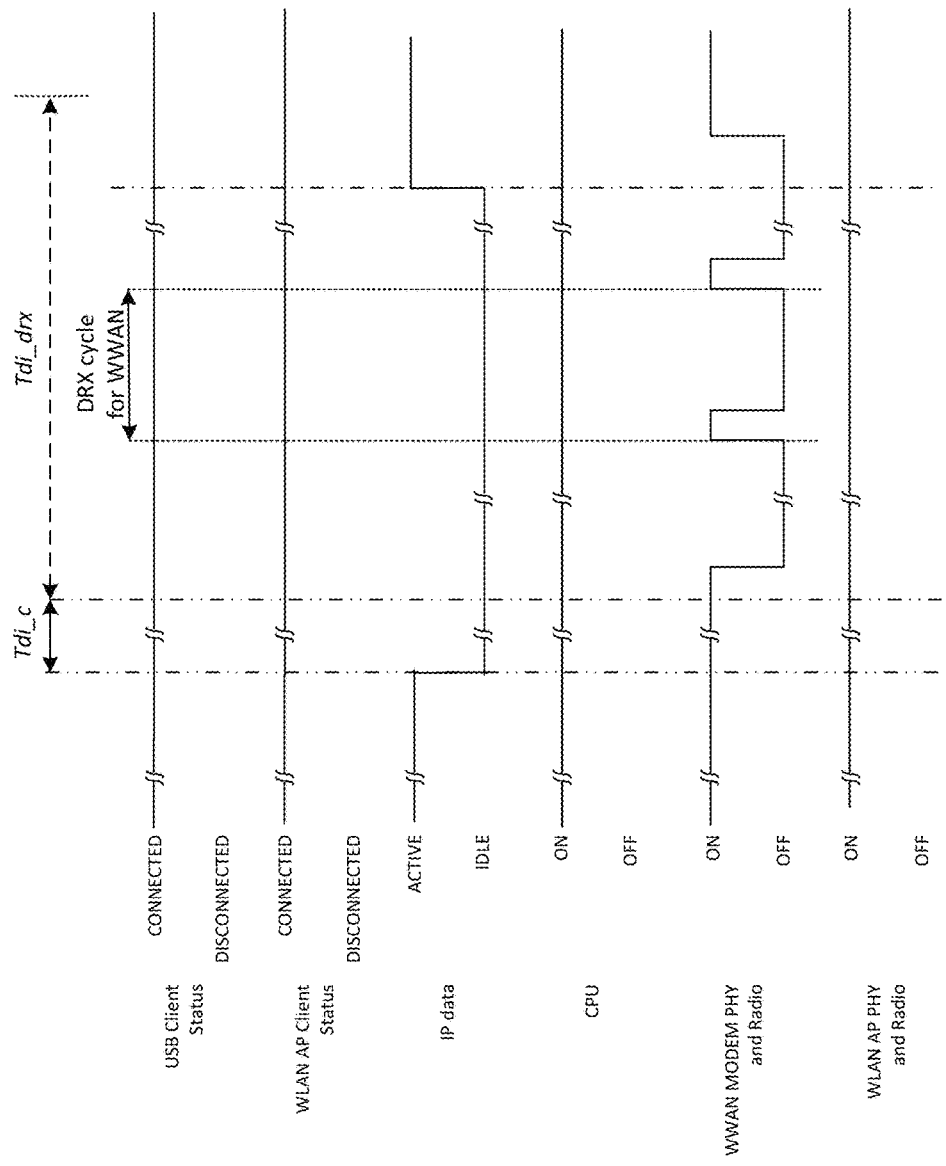
FIG. 19 illustrates the sequence events and actions according to the aspects of the present disclosure for MHSP Configuration2 for handling the scenario in which the WLAN client devices are actively connected to the mobile Hotspot without IP data transfer but later a WLAN client device initiates IP data transfer preventing the WWAN modem from going into Sleep mode.

FIG. 19 illustrates the sequence of events and actions according to the aspects of the present disclosure for MHSP Configuration2 for handling the scenario in which the client device connected through USB connectivity interface and the WLAN client devices may be actively connected to the mobile Hotspot. However, there may not be IP data transfer between the client devices and the mobile Hotspot. In this case, the WWAN modem may enter Idle DRX mode. At a later point in time, before the timer of duration Tdi_drx expires, the WLAN client device may initiate IP data transfer. This in turn may prevent the WWAN modem from going into Sleep mode.

Figure 20:
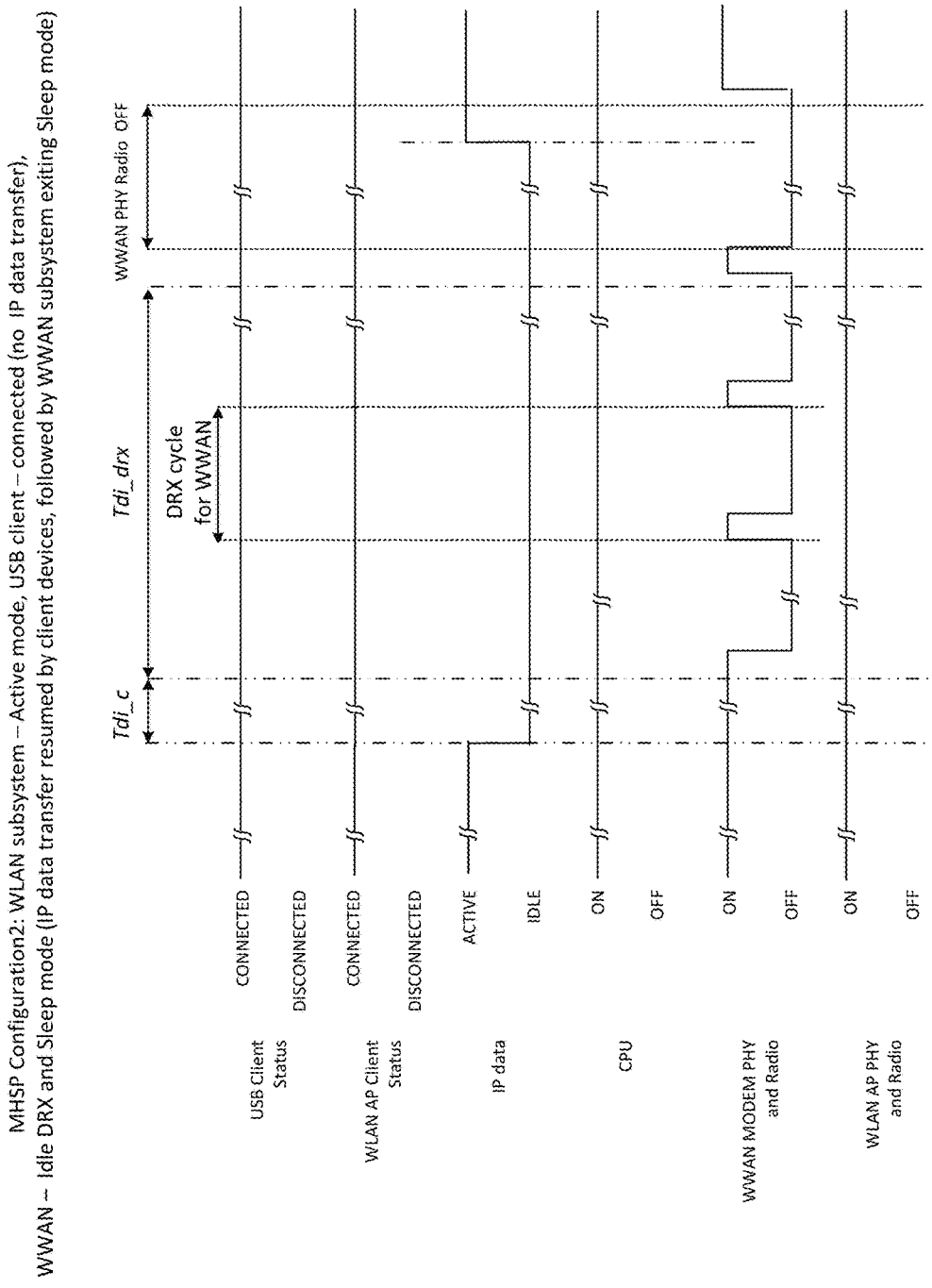
FIG. 20 illustrates the sequence events and actions according to the aspects of the present disclosure for MHSP Configuration2 for handling the scenario in which the WWAN modem enters Sleep mode and later exits the Sleep mode, enters Idle DRX mode and then enters Connected mode.

FIG. 20 illustrates the sequence of events and actions according to the aspects of the present disclosure for MHSP Configuration2 for handling the scenario in which the WLAN client device may be connected to the mobile Hotspot but there may not be IP data transfer in progress. Eventually, the timer of duration Tdi_drx expires and the WWAN modem may enter Sleep mode. Next the WLAN client device may initiate data transfer with the WLAN AP. This in turn may trigger the WWAN modem to exit the Sleep mode, enter Idle DRX mode and then enter Connected mode.

According to an aspect of the present disclosure, the Mobile Hotspot Controller may dynamically change the timer and counter values based on the time of the day. For example, if the local time of the day is between 10:00 PM and 6:00 AM, the DRX periodicity for WWAN modem and WLAN modem may be made longer and the timer values to determine whether to configure the WWAN modem to enter Idle DRX or Sleep mode may be made shorter. The start time of 10:00 PM and end time of 6:00 AM for change of values may be made user configurable. During this time, the Mobile Hotspot Controller may simply extend the Idle DRX timer by N times and shorten the timer durations Tnc_c, Tdi_c, Tnc_drx, Tdi_drx, Twf_drx by a factor of 1/M where N and M can be made configurable by the user and may be defaulted to 4 and 2 respectively.

According to an aspect of the present disclosure, the Mobile Hotspot Controller may use the default timers and counter values if the local time is between 6:00 AM to 10:00 PM.

According to an aspect of the present disclosure, the Mobile Hotspot Controller may dynamically change the timer and counter values at different times of the day for each day of the week. According to an aspect of the present disclosure, the Mobile Hotspot Controller may track the history of connections and internet access by one or more client devices over a period of time, including timestamp of the access, and then use the access history to adapt the timer and counter values such that their values may be larger when no access is expected and smaller when access is expected from client devices.

According to an aspect of the present disclosure, the Mobile Hotspot Controller may keep track of the identity, time of access, amount of DL and UL IP data transfer, etc. for the client devices connecting to it using one or more of its connectivity interfaces, i.e., WLAN AP, USB, Bluetooth, etc. The Mobile Hotspot Controller may use the internet access history of the client devices to adapt its configuration to balance the power saving and responsiveness to the user actions. For example, often it may be the case that there is only a single WLAN client device connected to the mobile Hotspot device. Furthermore, the WLAN client device may be using the mobile Hotspot device generally during certain times and at certain locations. According to an aspect of the present disclosure, the mobile Hotspot device may use the WWAN cell identity as a proxy for location of the mobile Hotspot device and the local time of the day to autonomously configure the Idle DRX cycle for the WWAN mode, the beacon interval for WLAN AP, and various other timers and counters to maximize the power saving while being responsive to the user requirements according to the time and location.

Some or all the aspects of the present disclosure may be applicable to any type of a mobile Hotspot device which may include (CPE), etc.

Although the present disclosure has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and
controlling, by the processing device, when a mobile broadband network releases an IP data connection with the WWAN modem,
receiving a notification from the WWAN modem that the IP data connection is released; and
entry of the WWAN modem into Idle Discontinuous Reception (DRX) mode.

2. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and
controlling, by the processing device, when the WWAN modem is in a Connected mode,
maintaining a timer of duration Tdi_c; and
transmitting a command to the WWAN modem to release an IP data connection with a mobile broadband network, when there is no active IP data transfer for the duration Tdi_c.

3. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device,
wherein the mobile hotspot device includes the processing device and a second processing device different from the processing device, in which the second processing device is in the WWAN modem and in which the processing device is external to the WWAN modem, the method further comprising
controlling, by the second processing device, monitoring an IP data connection with a mobile broadband network and tracking of IP data transfer at the mobile hotspot device.

4. The method of claim 3, further comprising:
controlling, by the second processing device, when no IP data transfer is observed by the second processing device after a time duration Tdi_c, releasing the IP data connection with the mobile broadband network and notifying the processing device that the IP data connection is released.

5. The method of claim 3, further comprising:
controlling, by the second processing device, when no IP data transfer is observed by the second processing device after a time duration Tdi_drx, transitioning of the WWAN modem from the Idle DRX mode to a Sleep mode and notifying the processing device of the transition.

6. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and
controlling, by the processing device, when the WWAN modem is in an Idle Discontinuous Reception (DRX) mode,
maintaining a timer of duration Tdi_drx; and
monitoring an IP data connection in the mobile hotspot device and tracking IP data transfer.

7. The method of claim 6, further comprising:
controlling, by the processing device, when there is no IP data transfer for the duration Tdi_drx, transmitting commands to the WWAN modem to transition from the Idle DRX mode to Sleep mode.

8. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and
controlling, by the processing device, when the WWAN modem is in a Connected mode,
maintaining a timer of duration Tnc_c; and when there is no active WLAN client device connected to a WLAN Access Point (AP) in the mobile Hotspot for the duration of Tnc_c and no other client device is connected to the mobile hotspot device, transmitting commands to the WWAN modem to release a connection with the mobile broadband network.

9. The method of claim 8, wherein the WWAN modem transitions from the Connected mode to an Idle Discontinuous Reception (DRX) mode after releasing the connection with the mobile broadband network.

10. The method of claim 9, wherein the time duration Tnc_c is less than or equal to a time duration Tdi_drx used to monitor an IP data connection in the mobile Hotspot device and track an IP data transfer when the WWAN modem is in the Idle DRX mode.

11. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotpot device; and
controlling, by the processing device, when the WWAN modem is in an Idle Discontinuous Reception (DRX) mode,
maintaining a timer of duration Tnc_drx; and
when there is no active WLAN client device connected to a WLAN Access Point (AP) in the mobile hotspot device for the duration of Tnc_drx and no other client device is connected to the mobile hotspot device, transmitting commands to the WWAN modem to transition from the Idle DRX mode to Sleep Mode.

12. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device, wherein the mobility state is a no mobility state, a low mobility state or a high mobility state.

13. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device
controlling, by the processing device,
based on a determined state for (2), (3) and (4), determining a cycle duration of Idle Discontinuous Reception (DRX) for a WWAN modem mode of the mobile hotspot device; and
when the determined state is changed to another determined state for (2), (3) and (4), configuring the WWAN modem with a second cycle duration of the Idle DRX in accordance with the another determined state.

14. The method of claim 13, wherein the mobile hotspot device includes the processing device and a second processing device different from the processing device, in which the second processing device is in the WWAN modem and in which the processing device is external to the WWAN modem, the method further comprising:
controlling, by the second processing device, when the WWAN modem receives an acknowledgement from the mobile broadband network concerning a change in the Idle DRX cycle of the WWAN modem, confirming the change in the Idle DRX cycle to the processing device.

15. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and
controlling, by the processing device, when the processing devices determines that at least one third client device is initiating a connection to the mobile hotspot device and the WWAN modem is in an Idle Discontinuous Reception (DRX) mode, transmitting a request to the WWAN modem to connect with a mobile broadband network to establish an IP connection.

16. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and
controlling, by the processing device, when the processing device determines that IP data transfer is initiated from at least one third client device connected with the mobile hotspot device and the WWAN modem is in an Idle Discontinuous Reception (DRX) mode, transmitting a request to the WWAN modem to connect with a mobile broadband network to establish an IP connection.

17. The method of claim 16, further comprising:
controlling, by the processing device, when the processing device determines that IP data transfer is initiated from the at least one third client device connected with the mobile hotspot device and the WWAN modem is in the Idle DRX mode, waiting for the WWAN modem to establish a connection with the mobile broadband network and for notification from the WWAN modem of successful connection establishment, before sending an IP data transfer request to the WWAN modem.

18. A method for power saving in a mobile hotspot device, the method comprising:

controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device, wherein transition of the operating mode of the WWAN modem from Idle Discontinuous Reception (DRX) mode to Sleep Mode is triggered based on at least one of expiration of a timer of duration Tnc_drx for tracking whether an active WLAN client device is connected with a WLAN Access Point (AP) of the mobile hotspot device, expiration of a timer of duration Tdi_drx for tracking whether there is an IP data transfer for an IP data connection in the mobile hotspot device, a determination of no connection from a WLAN client device observed by the WLAN AP after a number of $IDLE\_DRX_{nm\_nc}$ cycles, a determination of no active IP data transfer from a second WLAN client device observed by the WLAN AP after a number of $IDLE\_DRX_{nm\_ac}$ cycles, a determination of no connection from a third WLAN client device observed by the WLAN AP after a number of $IDLE\_DRX_{lm\_nc}$ cycles, a determination of no active IP data transfer from a fourth WLAN client device observed by the WLAN AP after a number of $IDLE\_DRX_{lm\_ac}$ cycles, a determination of no connection from a fifth WLAN client device observed by the WLAN AP after a number of $IDLE\_DRX_{hm\_nc}$ cycles, or a determination of no active IP data transfer from a sixth WLAN client device observed by the WLAN AP after a number of $IDLE\_DRX_{hm\_ac}$ cycles.

19. A method for power saving in a mobile hotspot device, the method comprising:

controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device, wherein a plurality of types of client devices are connectable with the mobile hotspot device to obtain internet service, and wherein the method further comprises:

controlling, by the processing device, when at least one third client device with a plurality of types of short range communication subsystems is connected with the mobile hotspot device, configuring a WWAN subsystem of the mobile hotspot device to an Idle Discontinuous Reception (DRX) mode or Sleep Mode only when no client device is connected to any short range communication subsystem of the mobile hotspot device and no active data transfer is ongoing in any of the at least one third client device connected to any of the short range communication subsystems of the mobile hotspot device.

20. A method for power saving in a mobile hotspot device, the method comprising:

controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and controlling, by the processing device, operating a WLAN Access Point (AP) of the mobile hotspot device in an Active mode and a Sleep mode, in which, in the Active mode, at least one of (i) the WLAN AP is controlled to broadcast a beacon signal to enable a first WLAN client device to detect presence of the WLAN AP, (ii) the WLAN AP is connected to at least one second WLAN client device and no active IP data transfer is ongoing, or (iii) the WLAN AP is involved in active IP data transfer with at least one third WLAN client device, and in which, in the Sleep Mode, the WLAN AP is powered off and not performing any receive or transmit operations.

21. A method for power saving in a mobile hotspot device, the method comprising:

controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and controlling, by the processing device, when a third client device with a plurality of type of short range communication subsystems is connected with the mobile hotspot device via Bluetooth or USB, operating a Bluetooth or USB subsystem of the mobile hotspot device in an Active mode and a Sleep mode.

22. A method for power saving in a mobile hotspot device, the method comprising:

controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and controlling, by the processing device, when a third client device is connected with the mobile hotspot device over a connectivity interface including at least one of USB or Bluetooth, and in active at least one of Downlink (DL) or Uplink (UL) data transfer, and when no WLAN client device is connected with a WLAN Access Point (AP) of the mobile hotspot device for a time duration Twf_nc, configuring a WLAN AP subsystem of the mobile hotspot device to enter into a Sleep mode while a WWAN subsystem is in Connected mode.

23. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and
controlling, by the processing device, (i) when a third client device is connected with the mobile hotspot device over a connectivity interface including at least one of USB or Bluetooth and is performing active IP data transfer, and (ii) when at least one first WLAN client device is connected with a WLAN Access Point (AP) of the mobile hotspot device and no active IP data transfer is initiated by any of the at least one first WLAN client device for a time duration Twf_drx, configuring a WLAN AP subsystem of the mobile hotspot device to enter into a Sleep mode while a WWAN subsystem of the mobile hotspot device is in Connected mode.

24. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and
controlling, by the processing device, when a third client device is connected through a USB connectivity interface with the mobile hotspot device and for a time duration Tusb there is no active at least one of Downlink (DL) or Uplink (UL) data transfer, transmitting a notification to a USB subsystem of the mobile hotspot device to suspend the USB interface.

25. The method of claim 24, further comprising:
controlling, by the processing device, when the USB subsystem is suspended, and each other modem subsystem in the mobile Hotspot is not connected to any client device, configuring the WWAN modem to enter Sleep mode.

26. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device,
wherein the mobile hotspot device includes a first CPU for operating a WWAN modem subsystem of the mobile hotspot device and a second CPU external to the first CPU for operating a WLAN Access Point (AP) modem subsystem of the mobile hotspot device, the method further comprising:
controlling, by the processing device, sleep and wake-up events independently for the WWAN modem subsystem and the WLAN AP modem subsystem for power saving.

27. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device,
wherein the mobile hotspot device includes a WWAN modem subsystem including first modem hardware and a WLAN Access Point (AP) modem subsystem including second modem hardware, the method further comprising:
controlling, by the processing device,
operation of the WWAN modem subsystem and the WLAN AP modem subsystem, and
power management for power savings independently for the first modem hardware of the WWAN modem subsystem and the second modem hardware of the WLAN AP modem subsystem.

28. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and
controlling, by the processing device,
changing a value of a timer or counter used to determine whether to configure the WWAN modem to enter an Idle Discontinuous Reception (DRX) mode or Sleep Mode, based on time of day
tracking a history of connections with and Internet access from the mobile hotspot device by at least one third client device over a period of time, in which the history includes timestamp of access; and
based on the history, adapting the value of the timer or the counter to increase when no access is expected and decrease when access is expected from the at least one third client device.

29. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and controlling, by the processing device,
tracking identity, time of access, amount of Downlink (DL) and Uplink (UL) IP data transfer for each third client device connecting to the mobile hotspot device using a connectivity interface including at least one of WLAN Access Point (AP), USB or Bluetooth; and
based on internet access history of the each third client device, adapting a configuration of the mobile hotspot device to balance power saving and responsiveness to an action by a user.

30. A method for power saving in a mobile hotspot device, the method comprising:
controlling, by a processing device, powering of a component of the mobile hotspot device based on (1) operating mode of a Wireless Wide Area Network (WWAN) modem in the mobile hotspot device, (2) a mobility state of the WWAN modem, (3) whether any client device over Wireless LAN (WLAN), Bluetooth, or a USB interface is connected to the mobile hotspot device and (4) Internet Protocol (IP) data connection status of any second client device connected to the mobile hotspot device; and controlling, by the processing device, based on WWAN cell identity as a proxy for location of the mobile hotspot device and local time of day, configuring an Idle Discontinuous Reception (DRX) cycle for a WWAN mode of the mobile hotspot device, a beacon interval for a WLAN Access Point (AP) of the mobile hotspot device, and predetermined timers and counters at the mobile hotspot device in accordance with power saving and being responsive to user requirements according to time and location.

* * * * *